(12) United States Patent
Alhooshani et al.

(10) Patent No.: US 12,428,319 B2
(45) Date of Patent: Sep. 30, 2025

(54) 2-ANTHRACENE AMMONIUM-BASED MAGNETIC IONIC LIQUIDS FOR SELECTIVE REMOVAL OF HEAVY METALS FROM WATER

(71) Applicant: KING FAHD UNIVERSITY OF PETROLEUM AND MINERALS, Dhahran (SA)

(72) Inventors: Khalid Alhooshani, Dhahran (SA); Ahmed Abdi Hassan, Dhahran (SA); Abdulkadir Tanimu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 724 days.

(21) Appl. No.: 17/847,674

(22) Filed: Jun. 23, 2022

(65) Prior Publication Data

US 2023/0416118 A1   Dec. 28, 2023

(51) Int. Cl.
| | |
|---|---|
| *C02F 1/28* | (2023.01) |
| *B01J 20/02* | (2006.01) |
| *B01J 20/28* | (2006.01) |
| *C02F 1/62* | (2023.01) |
| *B01J 20/24* | (2006.01) |
| *C02F 101/20* | (2006.01) |

(52) U.S. Cl.
CPC ............ *C02F 1/28* (2013.01); *B01J 20/0288* (2013.01); *B01J 20/28004* (2013.01); *C02F 1/62* (2013.01); *C02F 2101/20* (2013.01)

(58) Field of Classification Search
CPC .... B01J 20/3236; B01J 2220/42; B01J 20/24; B01J 20/22; B01J 20/2803;
(Continued)

(56) References Cited

U.S. PATENT DOCUMENTS

2016/0304630 A1* 10/2016 Dichtel ............... B01J 20/3204

FOREIGN PATENT DOCUMENTS

| CN | 107413306 A | 12/2017 |
|---|---|---|
| CN | 108586458 A | 9/2018 |

(Continued)

OTHER PUBLICATIONS

Oviedo, et al. ; Two-step separation and determination of inorganic As species in water, soil, and sediment samples by implementing two ionic liquids in dispersive liquid-liquid microextraction with electrothermal atomic absorption spectrometry detection ; Microchemical Journal, vol. 159 ; Dec. 2020 ; Abstract Only ; 2 Pages.

(Continued)

*Primary Examiner* — Allison G Fitzsimmons
(74) *Attorney, Agent, or Firm* — Oblon, McClelland, Maier &Neustadt, L.L.P.

(57) ABSTRACT

An adsorbent and a method of preparing the adsorbent are described. The adsorbent includes a 2-anthracene ammonium magnetic ionic liquid (MIL), and a $[FeCl_4]^-$ or a $[CoCl_3]^-$ ion. The adsorbents, 2-anthracene ammonium tetrachloroferrate (III) ([2AA] $FeCl_4$) and 2-anthracene ammonium trichlorocobaltate (II) ([2AA] $CoCl_3$), are prepared by protonation of 2-aminoanthracene, followed by complexation with $FeCl_3/CoCl_2$. The adsorbent of the present disclosure is effective in removing contaminants such as heavy metal ions from an aqueous system in a cost-efficient and selective manner.

10 Claims, 17 Drawing Sheets

(58) Field of Classification Search
CPC .............. B01J 20/28009; B01J 20/3202; B01J 20/3433; B01J 20/12; B01J 20/3206; B01J 20/3253; B01J 20/3475; B01D 17/0202; B01D 2311/2626; B01D 2313/40; B09C 1/08; C01B 32/05; C01B 32/336; C02F 1/281; C02F 1/283; C02F 1/288; C02F 1/285; C02F 1/28; C02F 1/286; C02F 1/00; C02F 1/5236; C02F 1/58; C02F 1/002; C02F 1/52; C02F 1/62; C02F 1/681; C02F 2103/007; C02F 2101/306

See application file for complete search history.

(56) References Cited

FOREIGN PATENT DOCUMENTS

| CN | 110745900 A | 2/2020 | |
|---|---|---|---|
| CN | 113880193 A | 1/2022 | |
| CN | 114130364 A | 3/2022 | |
| EP | 3733598 A1 * | 11/2020 | .............. C01B 32/05 |

OTHER PUBLICATIONS

Pirkwieser, et al. ; Novel 3-Hydroxy-2-Naphthoate-Based Task-Specific Ionic Liquids for an Efficient Extraction of Heavy Metals ; Frontiers in Chemistry, vol. 6, Article 172 ; May 2018 ; 11 Pages.

Chatzimitakos, et al. ; Magnetic Ionic Liquids in Sample Preparation: Recent Advances and Future Trends ; Separations, 8, 153 ; Sep. 13, 2021 ; 28 Pages.

Sajid ; Magnetic ionic liquids in analytical sample preparation: A literature review ; TrAC Trends in Analytical Chemistry, vol. 113 ; pp. 210-223 ; Apr. 2019 ; Abstract Only ; 3 Pages.

* cited by examiner

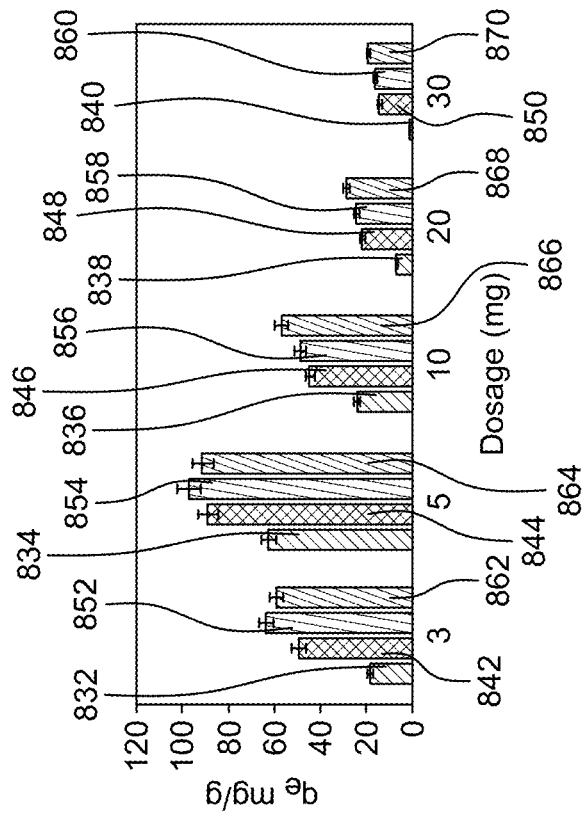
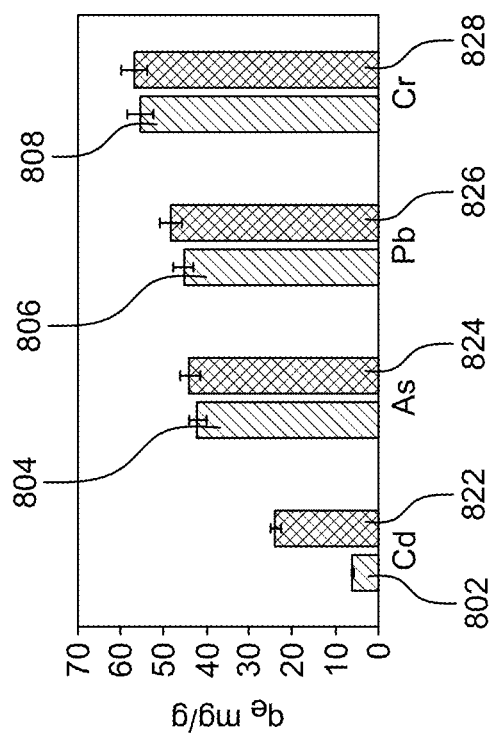
FIG. 8B
FIG. 8A

2-ANTHRACENE AMMONIUM-BASED MAGNETIC IONIC LIQUIDS FOR SELECTIVE REMOVAL OF HEAVY METALS FROM WATER

BACKGROUND

Technical Field

The present disclosure is directed to magnetic ionic liquids, and particularly to 2-anthracene ammonium-based magnetic ionic liquids, methods of use for selective removal of heavy metals from water and methods of preparing the magnetic ionic liquids.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

More than 70% of the problems in most developing countries are due to water pollution and contamination. Such contaminants are dyes, heavy metals, pesticides, pharmaceutical and drug-related pollutants. Heavy metals are metals or metalloids with an atomic density greater than 4000 $kg/m^3$. They are generally toxic even at trace concentrations; good examples are mercury, lead, cadmium, arsenic, and chromium. Therefore, the proper removal of heavy metals from sub-surface and wastewater is essential.

Various methods for the removal of heavy metals from water include adsorption, membrane separation, advanced oxidation, ion exchange, filtration, chemical oxidation, biological processes, reverse osmosis (RO), etc. However, adsorption is the most preferred method due to its low cost and simplicity of approach. Conventionally, activated carbon was the widely used adsorbent due to its high porosity. However, the high cost associated with it is a significant drawback. In recent years, ionic liquids and magnetic ionic liquids (MILs) have been increasingly used as adsorbents to adsorb heavy metals. However, there is still a need to develop cost-effective adsorbents with high selectivity to remove heavy metals from wastewater, groundwater, and industrial effluents.

It is one object of the present disclosure to provide an adsorbent effective for removing contaminants from aqueous solution.

SUMMARY

In an exemplary embodiment, an adsorbent is described. The adsorbent includes a 2-anthracene ammonium magnetic ionic liquid (MIL).

In some embodiments, the 2-anthracene ammonium MIL comprises a $[FeCl_4]^-$ or a $[CoCl_3]^-$ ion.

In some embodiments, the 2-anthracene ammonium MIL comprises a $[FeCl_4]^-$ or a $[CoCl_3]^-$ ion and has thermal stability up to a temperature of 400° C.

In some embodiments, the 2-anthracene ammonium trichlorocobaltate is in the form of nanoflakes having an average diameter of 2 to 10 μm before adsorption.

In some embodiments, the 2-anthracene ammonium trichlorocobaltate is in the form of nanoflakes having an average thickness of 1 to 8 μm before adsorption.

In some embodiments, the 2-anthracene ammonium trichlorocobaltate has 2 to 8 times thicker nanoflakes after adsorption of a contaminant.

In some embodiments, the adsorbent has an adsorption capacity in the range of 3 to 80 mg/g for 2-anthracene ammonium tetrachloroferrate.

In some embodiments, the adsorbent has an adsorption capacity in the range of 10 to 80 mg/g for 2-anthracene ammonium trichlorocobaltate.

In an exemplary embodiment, a method of reducing a contaminant concentration from an aqueous solution with the adsorbent is described. The method includes mixing the adsorbent with the aqueous solution containing contaminants.

In some embodiments, the concentration of the contaminant in the aqueous solution is 25 to 100 ppm.

In some embodiments, the aqueous solution is at 10 to 50° C.

In some embodiments, the adsorbent reduces the contaminant concentration from the aqueous solution by adsorption.

In some embodiments, the 2-anthracene ammonium trichlorocobaltate has 0.2 to 6 times higher adsorption capacity compared to the 2-anthracene ammonium tetrachloroferrate.

In some embodiments, the contaminants are metal ions.

In some embodiments, the metal ion is at least one metal selected from the group of $Cd^{2+}$, $As^{3+}$, $Pb^{2+}$ and $Cr^{3+}$.

In some embodiments, the 2-anthracene ammonium trichlorocobaltate adsorbent maintains an adsorption efficiency of at least 90% for removing metal ions over at least 5 purification cycles.

In an exemplary embodiment, a method of synthesis of 2-anthracene ammonium tetrachloroferrate or 2-anthracene ammonium trichlorocobaltate is described. The method includes mixing HCl with 2-aminoanthracene to form an anthracene-2-aminium chloride intermediate, and further washing the intermediate. The method further mixing $FeCl_3$ or $CoCl_2$ with the intermediate after the washing to form 2-anthracene ammonium tetrachloroferrate or 2-anthracene ammonium trichlorocobaltate, respectively; and further washing 2-anthracene ammonium tetrachloroferrate or 2-anthracene ammonium trichlorocobaltate.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 8A shows the adsorption performance of the MIL adsorbents, according to certain embodiments;

FIG. 8B shows an effect of [2-AA] $CoCl_3$ dosage on adsorption performance, according to certain embodiments;

DETAILED DESCRIPTION

Figure 1:
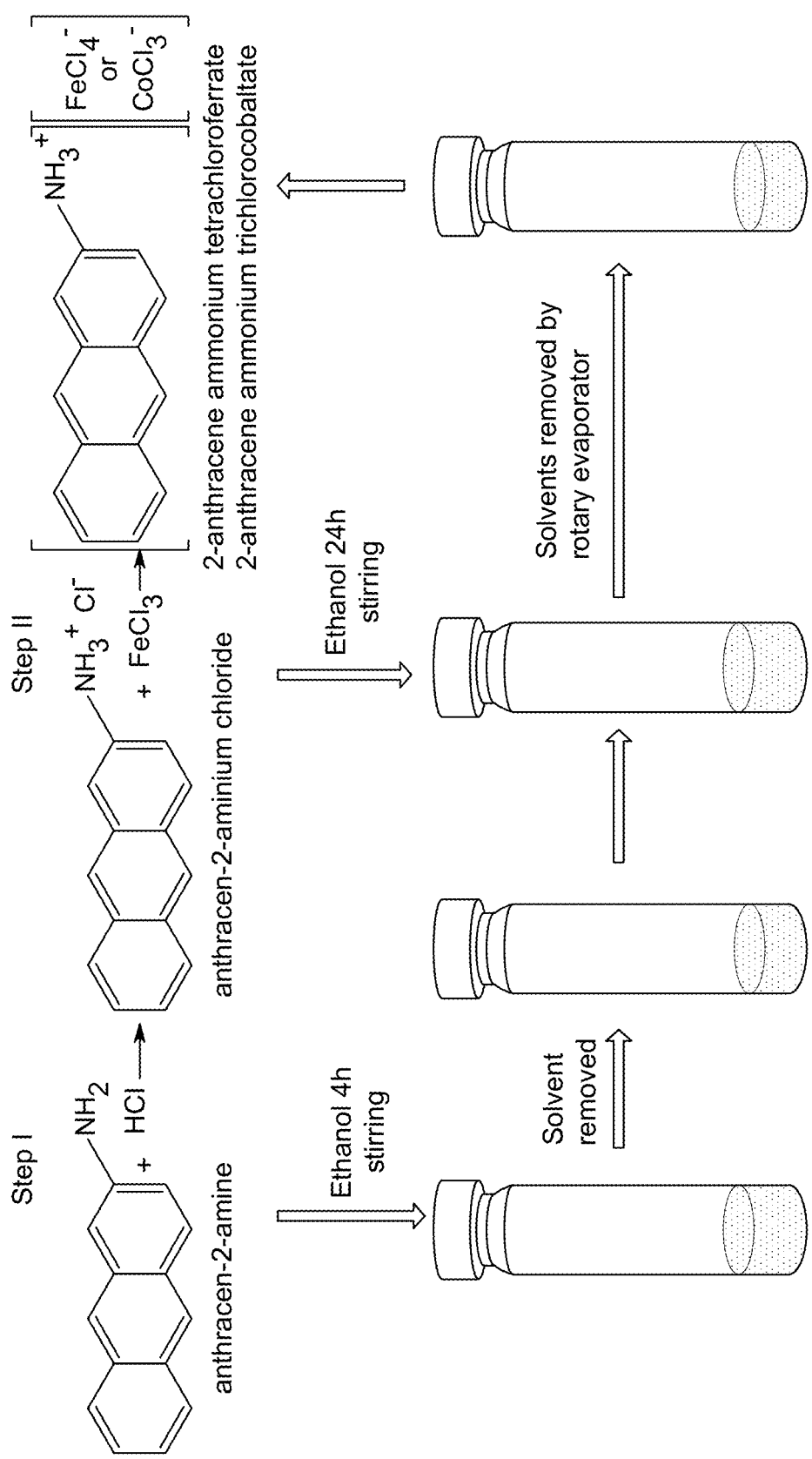
FIG. 1 is a synthesis procedure for 2-anthracene ammonium tetrachloroferrate (III) and 2-anthracene ammonium trichlorocobaltate (II), according to certain embodiments.

The present disclosure will be better understood with reference to the following definitions.

It will be understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

In the drawings, like reference numerals designate identical or corresponding parts throughout the several views. Further, as used herein, the words "a," "an" and the like generally carry a meaning of "one or more," unless stated otherwise. Also, the use of "or" means "and/or" unless stated otherwise. Similarly, "comprise," "comprises," "comprising" "include," "includes," and "including" are interchangeable and not intended to be limiting.

Furthermore, the terms "approximately," "approximate," "about," and similar terms generally refer to ranges that include the identified value within a margin of 20%, 10%, or preferably 5%, and any values there between. For example, if a stated value is about 8.0, the value may vary in the range of 8±1.6, ±1.0, ±0.8, ±0.5, ±0.4, ±0.3, ±0.2, or ±0.1.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

An adsorbent including a 2-anthracene ammonium magnetic ionic liquid (MIL) is described. Magnetic ionic liquids include an organic cation and an inorganic or organic anion having melting points at or below 100° C. 2-anthracene ammonium magnetic ionic liquid is a solid state at 20 to 30° C. which makes it more favorable as a sorbent with larger surface area compared to liquid state. 2-anthracene ammonium magnetic ionic liquid has an average melting point in a range of 60 to 90° C., preferably 70° C. High melting point above 20 to 30° C. can be attributed to the rigidity of the benzene rings due to conjugation arising from the rings. Magnetic ionic liquids have paramagnetic properties by themselves without the need of adding magnetic particles. These paramagnetic properties are induced by the anion, the cation or both. Most common paramagnetic ionic liquids are those that contain transition metal or lanthanide complexes in their anion structure. These tuneable fluids present unique physicochemical properties, resulting in materials responsive to an external magnetic field.

In an embodiment, the 2-anthracene ammonium MIL of the present disclosure includes a $[FeCl_4]^-$ or a $[CoCl_3]^-$ ion. In an embodiment, the 2-anthracene ammonium includes $[FeCl_4]^-$ ion as an anionic component. In a preferred embodiment, the 2-anthracene ammonium includes $[CoCl_3]^-$ ion as an anionic component. In an embodiment, the anionic component is a combination of $[FeCl_4]^-$ ion and a $[CoCl_3]^-$ ion.

The MIL of the present disclosure, i.e., 2-anthracene ammonium tetrachloroferrate and 2-anthracene ammonium trichlorocobaltate, may be used as an adsorbent in a chromatographic technique, when MILs are immobilized onto the solid supports.

In an embodiment, the adsorbent is 2-anthracene ammonium tetrachloroferrate. It has an adsorption capacity in the range of 3 to 100 mg/g, preferably 3 to 96 mg/g, preferably 3 to 90 mg/g, preferably 3 to 85 mg/g, preferably 3 to 80 mg/g.

In a preferred embodiment, the adsorbent is 2-anthracene ammonium trichlorocobaltate. The 2-anthracene ammonium trichlorocobaltate is preferably in the form of nanoflakes having an average diameter of 1 to 25 µm, preferably 1 to 20 µm, preferably 1 to 15 µm, preferably 2 to 10 µm prior to adsorption. In another embodiment, the 2-anthracene ammonium trichlorocobaltate is in the form of nanoflakes having an average thickness of 0.5 to 15 µm, preferably 1 to 10 µm, preferably 1 to 9 µm, preferably 1 to 8 µm prior to adsorption. In an embodiment, the nanoflakes of 2-anthracene ammonium trichlorocobaltate are 1.5 to 12 times, preferably 2 to 10 times, preferably 2 to 9 times, preferably 2 to 8 thicker after adsorption than before adsorption. In an embodiment, the 2-anthracene ammonium trichlorocobaltate has an adsorption capacity in the range of 10 to 120 mg/g, preferably 10 to 110 mg/g, preferably 10 to 100 mg/g, preferably 10 to 90 mg/g, preferably 10 to 80 mg/g.

The adsorbent of the present disclosure (2-anthracene ammonium tetrachloroferrate or 2-anthracene ammonium trichlorocobaltate) may be prepared by mixing HCl with 2-aminoanthracene to form an anthracene-2-aminium chloride intermediate. The intermediate was prepared by mixing 1 to 5 M, preferably 1 to 4 M, preferably 2 to 4 M, preferably 3 M HCl with 2-aminoanthracene under constant stirring for 1 to 10 hours, preferably 1 to 8 hours, preferably 2 to 6 hours, preferably 3 to 5 hours, preferably 4 hours at 20 to 30° C. The method further includes washing the precipitated intermediate. In an embodiment, the intermediate may be washed with an organic solvent or an inorganic solvent. The organic solvent can include one or more selected from tetrahydrofuran, ethyl acetate, dimethylformamide, dichloromethane, acetone, acetonitrile, chloroform, and dimethyl sulfoxide. In a preferred embodiment, the intermediate was washed with an inorganic solvent which may include ammonium hydroxide solution, preferably water, and more preferably, deionized water. This was done to remove the excess acid in the intermediate till the pH of the intermediate was about 3.5.

The method further includes mixing $FeCl_3$ or $CoCl_2$ as a solution with the intermediate after the washing to form 2-anthracene ammonium tetrachloroferrate or 2-anthracene ammonium trichlorocobaltate, respectively. In an embodiment, an equimolar concentration of the $FeCl_3$ or $CoCl_2$ and the intermediate were used to prepare 2-anthracene ammonium tetrachloroferrate or 2-anthracene ammonium trichlorocobaltate. The method further includes washing 2-anthracene ammonium tetrachloroferrate or 2-anthracene ammonium trichlorocobaltate. The washing was preferably performed with an inorganic solvent, such as water or ammonium hydroxide solution. A method for reducing a contaminant concentration in an aqueous solution with the adsorbent of the present disclosure is described. The method includes mixing the adsorbent with the aqueous solution containing one or more contaminants. In an embodiment, the adsorbent is 2-anthracene ammonium trichlorocobaltate. In another embodiment, the adsorbent is 2-anthracene ammonium tetrachloroferrate. The adsorbents may be used to remove the contaminants in an aqueous solution. In an embodiment, the aqueous solution may be wastewater, groundwater, surface water, and runoff from agricultural activities. In an embodiment, the aqueous solution is at 2 to 80° C., preferably 3 to 75° C., preferably 4 to 70° C., preferably 5 to 65° C., preferably 10 to 60° C., preferably 10 to 55° C., preferably 10 to 50° C. The contaminants may be metal ions. The metal ion is preferably at least one metal selected from the group of $Cd^{2+}$, $As^{3+}$, $Pb^{2+}$, and $Cr^{3+}$. In an embodiment, the concentration of the contaminant is 10 to 150 ppm, preferably 15 to 140 ppm, preferably 20 to 130 ppm, preferably 25 to 120 ppm, preferably 25 to 110 ppm, preferably 25 to 100 ppm. In other words, the adsorbent can effectively remove contaminants in the aqueous solution at a concentration as low as 10 to 150 ppm, preferably 15 to 140 ppm, preferably 20 to 130 ppm, preferably 25 to 120 ppm, preferably 25 to 110 ppm, preferably 25 to 100 ppm. Adsorbents have preferentially removed the targeted metal ions with adsorption capacity in the range of 3-70 mg/g, preferably 5.73-55.5 mg/g for $[2-AA]FeCl_4$ and 20-60 mg/g, preferably 23.6-56.8 mg/g for $[2-AA]CoCl_3$. Overall, both adsorbents have shown higher selectivity towards $As^{3+}$, $Pb^{2+}$ and $Cr^{3+}$ with stronger binding sites compared to $Cd^{2+}$. However, based on the obtained results, the $[2-AA]CoCl_3$ was adopted as the best adsorbent for the removal of these heavy metal ions.

The adsorbent reduces the contaminant concentration from the aqueous solution by adsorption. In an embodiment, the 2-anthracene ammonium trichlorocobaltate has 0.1 to 10 times, preferably 0.2 to 9 times, preferably 0.2 to 8 times, preferably 0.2 to 7 times, preferably 0.2 to 6 times higher adsorption capacity compared to the 2-anthracene ammonium tetrachloroferrate based on the same ionic contaminant.

Thermal stabilities of MILs are verified by TGA analyzing the temperatures at which the MILs start to decompose, along with the extent of mass change determined using thermogravimetry. The adsorbent of the present disclosure has thermal stability measure by TGA decomposition up to 700-800° C., preferably 600-700° C., preferably 500-600° C., preferably 400-500° C., preferably 400° C. The TGA decomposition for both 2-anthracene ammonium trichlorocobaltate and 2-anthracene ammonium tetrachloroferrate show similar decomposition pattern, with gradual decomposition up to 400° C. for [2-AA]CoCl$_3$ and 500° C. for [2-AA]FeCl$_4$.

[2-AA]FeCl$_4$ is ferromagnetic while [2-AA]CoCl$_3$ is superparamagnetic. The superparamagnetic property of [2-AA]CoCl$_3$ is attributed to crystallite size reduction, which decreases the anisotropy energy, hence favoring the superparamagnetism of the material. In addition, the cobalt-containing MILs of the present disclosure can have high saturation magnetization and high two-curie temperature due to allotropic characteristics of the element. In the case of [2-AA]FeCl$_4$ ferromagnetic properties can be associated with the presence of iron which has a curie point at 770° C. and changes its crystalline structure above the curie point. Furthermore, a linear relationship between the magnetic field and the magnetization has been recorded and obtained at room temperature indicating that both MILs are magnetic. The magnetic susceptibility was found to be 1.17 and 1.16 for [2-AA]FeCl$_4$ and [2-AA]CoCl$_3$ respectively. This implies that both MILs have magnetic properties that can be attributed to iron and cobalt due to their structures which allow their electrons to line up more easily forming the magnetic field of the materials.

The adsorbent of the present disclosure can be used multiple times with high efficiency and selectivity towards the metal ions. In an embodiment, the 2-anthracene ammonium trichlorocobaltate adsorbent maintains an adsorption efficiency of at least 99%, preferably 98%, preferably 97%, preferably 96%, preferably 95%, preferably 94%, preferably 93%, preferably 92'%, preferably 90% for removing metal ions over at least 10 purification cycles, preferably 9 purification cycles, preferably 8 purification cycles, preferably 7 purification cycles, preferably 6 purification cycles, preferably 5 purification cycles.

Aspects of the present disclosure are directed towards the facile synthesis of two 2-anthracene ammonium-based magnetic ionic liquids (MILs), 2-anthracene ammonium tetrachloroferrate (III) ([2AA] FeCl$_4$) and 2-anthracene ammonium trichlorocobaltate (II) ([2AA]CoCl$_3$) by protonation of 2-aminoanthracene, followed by complexation with FeCl$_3$/CoCl$_2$. The MILs were tested for adsorptive removal of $Cd^{2+}$, $As^{3+}$, $Pb^{2+}$, and $Cr^{3+}$ from water sources. The results indicate that upon treatment with a 1 mg, preferably 2 mg, preferably 3 mg, preferably 4 mg, preferably 5 mg, preferably 6 mg, preferably 7 mg, preferably 8 mg, preferably 9 mg, preferably 10 mg dosage of MILs in a 1 mL, preferably 2 mL, preferably 3 mL, preferably 4 mL, preferably 5 mL, preferably 6 mL, preferably 7 mL, preferably 8 mL, preferably 10 mL aqueous solution of 70 ppm, preferably 65 ppm, preferably 60 ppm, preferably 55 ppm, preferably 50 ppm each of $Cd^{2+}$, $As^{3+}$, $Pb^{2+}$, and $Cr^{3+}$, the adsorption capacity (mg/g) was in the range of 4-70, preferably 4-65, preferably 5-60, preferably 5-57, preferably 5-56, preferably 5.5-55.8, preferably 5.73-55.5 and 22-80, preferably 22-75, preferably 22-70, preferably 22-65, preferably 22-60, preferably 23.6-56.8 for [2A-A] FeCl$_4$ and [2A-A] CoCl$_3$, respectively. The [2A-A] CoCl$_3$ was more effective at a pH 7-9, and equilibrium adsorption was achieved after 10 minutes, preferably 5 minutes of contact time. The adsorption process proceeded via the pseudo-second-order pathway. The Langmuir isotherm model was the best fit for the adsorption process (with $q_{max}$=200-400 mg/g, preferably 210-390 mg/g, preferably 215-380 mg/g, preferably 220-370 mg/g, preferably 225-360 mg/g, preferably 227-357 mg/g) for all the targeted metal ions. The [2A-A] CoCl$_3$ adsorbent demonstrated practicality with large distribution and selectivity coefficients of the targeted ions and up to ten times regeneration.

Examples

The following examples describe and demonstrate exemplary embodiments of the magnetic ionic liquids for the adsorption of heavy metal ions, as described herein. The examples are provided solely for the purpose of illustration and are not to be construed as limitations of the present disclosure, as many variations thereof are possible without departing from the spirit and scope of the present disclosure.
Materials and Methods All chemicals were used as received without further purification. Ethanol, hydrochloric acid, calcium chloride, potassium chloride, magnesium chloride, sodium chloride, cobalt (II) chloride hexahydrate, and 2-aminoanthracene were received from Sigma-Aldrich, USA. Ferric chloride was purchased from Fluka Analytical, cadmium nitrate tetrahydrate, arsenic trichloride, lead (II) nitrate, and chromium (III) nitrate nonahydrate (99%) were acquired from Merck Chemicals, USA.
Synthesis of 2-Anthracene Ammonium-Based Magnetic Ionic Liquids The synthesis procedure involved two steps. In the first step, 3M HCl in ethanol solvent was added to 2-aminoanthracene ([2-AA]) in a round bottom flask, and the solution was vigorously stirred for 4 h to form anthracene-2-aminium chloride ([2-AA] Cl) as an intermediate. The ethanol solvent in the reaction flask was removed using a rotary evaporator. Further, the [2-AA] Cl intermediate was washed with de-ionized water to about pH 3.5 to remove the excess acid. Thereafter, an equimolar amount of FeCl$_3$ or CoCl$_2$ in ethanol was added to the flask containing the [2-AA] Cl intermediate and stirred for 24 h to form 2-anthracene ammonium tetrachloroferrate (III) or 2-anthracene ammonium trichlorocobaltate (II) respectively. The final product was washed several times until there were no traces of $Fe^{3+}$ or $Co^{2+}$ in the supernatant liquid, as shown in FIG. 1.
Characterization of 2-Anthracene Ammonium-Based Magnetic Ionic Liquids The $^1$H NMR spectra of the starting material 2-AA and the intermediate [2-AA] Cl were recorded on the Bruker NMR 400 MHz model AVANCE 3. Fourier Transform Infrared (FTIR) spectra of the 2-AA, [2-AA] Cl intermediate, and the ionic liquid adsorbents were recorded between 4000 cm-1 and 400 cm$^1$ using the Smart iTR NICOLET iS10 model. The thermogravimetric (TGA) analysis was carried out on a thermogravimetric analyzer model SDT Q600 instrument. About 10 mg of the MIL was heated over a temperature range of 30 to 900° C. in an alumina pan at the rate of 10° C./min with a nitrogen flow of 50 mL/min to obtain the decomposition curve. The UV/Vis absorption spectrum was measured on a UV/Vis spectrophotometer (Genesys 10S Thermo Fisher Scientific, USA). The adsorbents were dissolved in ethanol to form about $1\times10^{-3}$ M concentration, then inserted into the sample cuvettes for spectrum measurement. The Zeta potential of the MIL adsorbents was recorded using the model Analyzer Zeta PALS. Six different pH values in the range 2-12 were studied as a function of zeta potential (mV). DaynaCool (Quantum Design, US) instrument was used to measure the magnetization properties of the MILs. About 27.2 mg of each sample was loaded, and both temperature and magnetic field varied. The morphology of [2-AA] CoCl$_3$ MIL before and after adsorption was studied using the Scanning Electron Microscopy (SEM)

(JEOL JSM-6610LV instrument), and the constituent elements (in weight percent) were determined using Energy Dispersive X-Ray analysis (EDX).

Heavy Metals Removal Test

The heavy metals' adsorption experiment was carried out at room temperature in a batch system. A 10 mL aqueous solution containing the mixture of four heavy metal ions ($Cd^{2+}$, $As^{3+}$, $Pb^{2+}$, and $Cr^{3+}$) with initial concentrations ranging from 50-350 ppm was added to a 50 mL vial, and adsorbent (5-30 mg) was subsequently dispersed into the heavy metal ions solution in the vial and sealed. The solution mixture was stirred for 5 minutes to 24 h until equilibrium was reached. Afterward, the adsorbent was isolated by centrifuging at 3500 rpm, and the supernatant was analyzed for the presence of heavy metals using ICP-OES (Plasma Quant® PQ 9000). The adsorption capacity (QE, mg/g) of the heavy metal ions was determined using equation (1) below:

$$q_e = \left(\frac{V(C_i - C_e)}{m}\right) \quad (1)$$

where V (L) represents the volume of the heavy metals' solution, $C_i$ and $C_e$ represent the initial and equilibrium concentrations of the solutions in mg/L. The m represents the mass of the adsorbents.

The effects of adsorption parameters such as pH, adsorbent dosage, contact time, and concentration on heavy metal ions were studied following the same approach. The evaluated adsorption conditions were extended to real wastewater and raw groundwater samples from the Khobar wastewater treatment plant and the King Fahd University of Petroleum and Minerals (KFUPM) maintenance department. The competitive adsorption of other metal ions ($K^+$, $Na^+$, $Ca^{2+}$, and $Mg^{2+}$) and reusability studies of the adsorbents was performed.

Characterization of 2-Anthracene Ammonium-Based MIL Adsorbents

Figure 2:
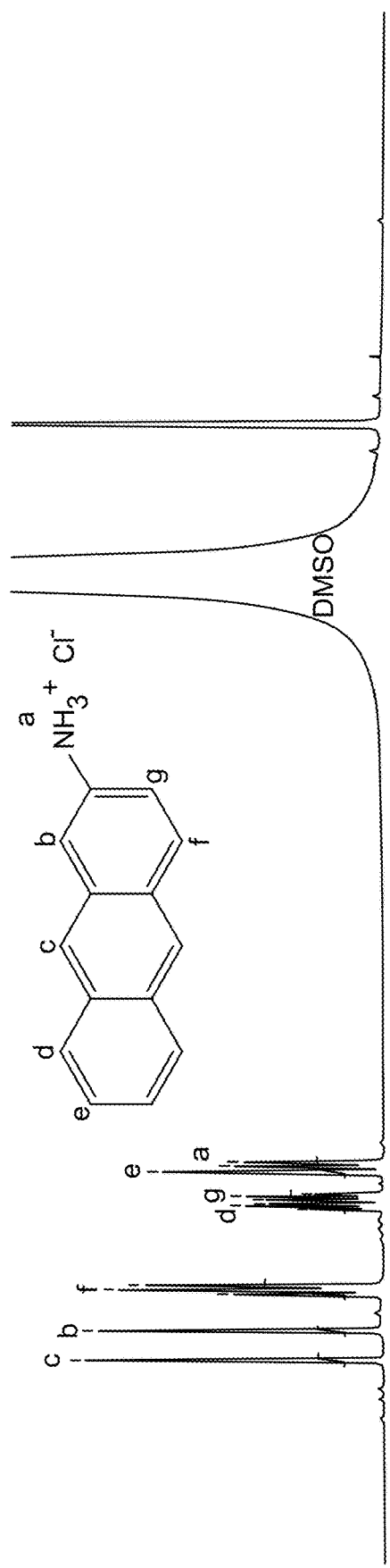
FIG. 2 is a $^1$H-nuclear magnetic resonance (NMR) spectrum of 2-aminoanthracene, according to certain embodiments.
Figure 3:
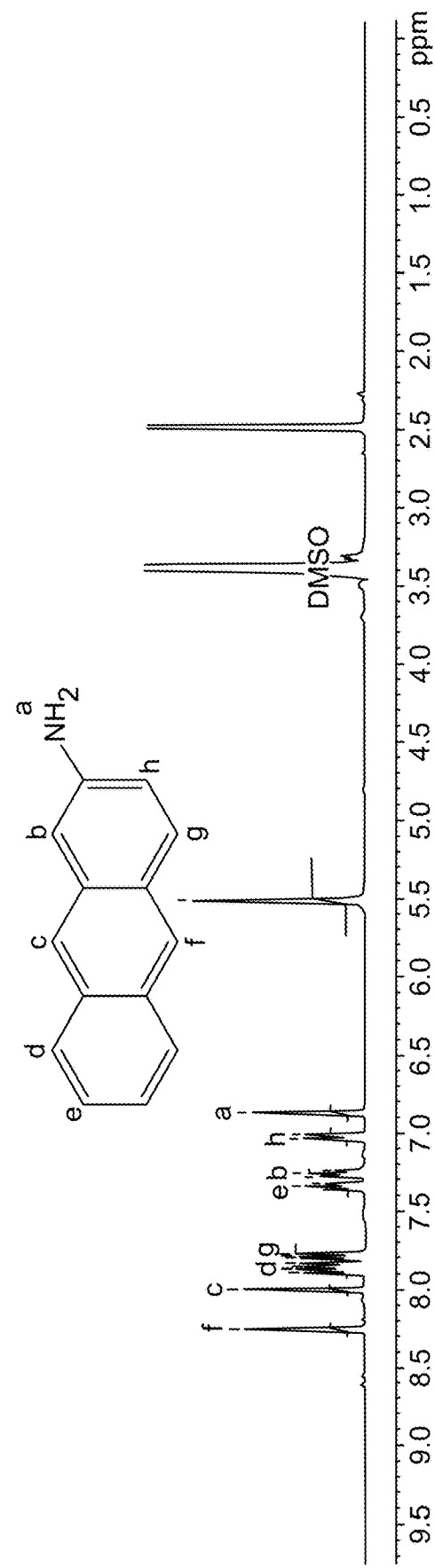
FIG. 3 is a $^1$H-NMR spectrum of anthracene-2-aminium chloride intermediate, according to certain embodiments.

A $^1H$ NMR spectra of 2-AA (FIG. 3) and [2-AA] Cl intermediate (FIG. 2) are depicted.

The 2-AA spectrum shows the amine N—H protons at the chemical shift of 5.5 ppm. After protonation, the N—H signal became very weak and was strongly shifted downfield to around 6=8-9. Similarly, all the C—H protons signals were downfield shifted by 6=0.3. No additional peaks were observed upon protonation of 2-AA to form [2-AA] Cl. The integral area peaks were directly proportional to the number of hydrogen atoms, implying the high purity of the [2-AA] Cl intermediate.

Figure 4A:
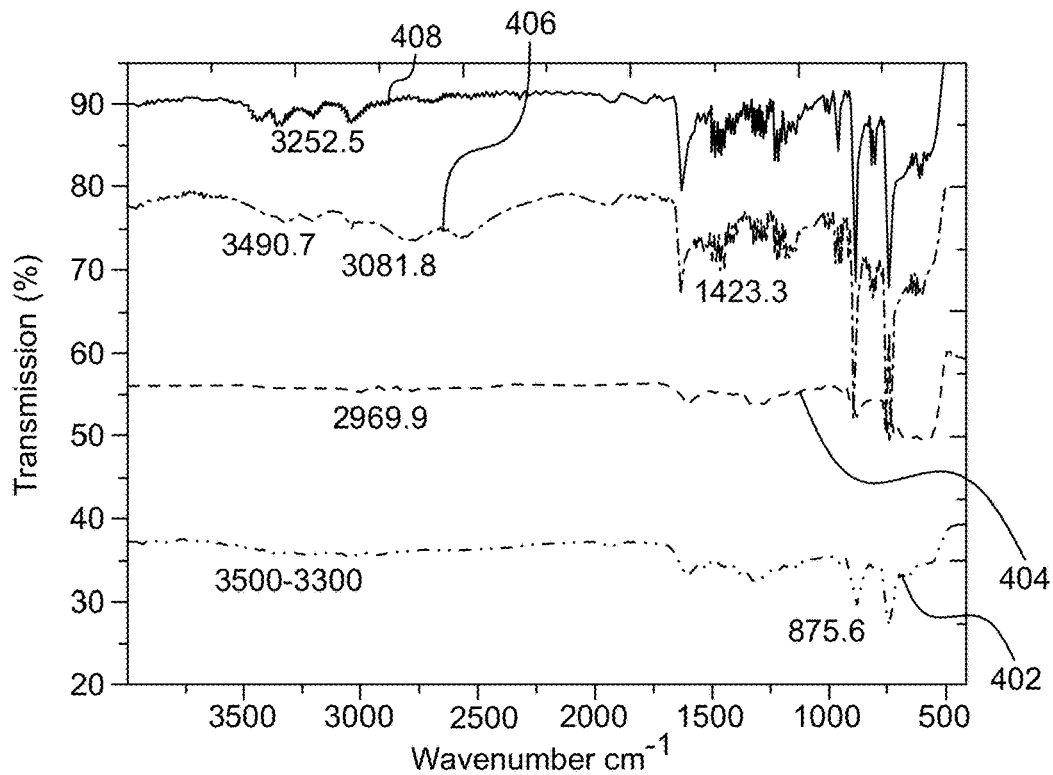
FIG. 4A shows Fourier Transform Infrared (FTIR) spectrum of 2-aminoanthracene, intermediate anthracen-2-aminium chloride, 2-anthracene ammonium tetrachloroferrate (III), 2-anthracene ammonium trichlorocobaltate (II), according to certain embodiments.

Referring to FIG. 4A, FT-IR spectrum of 2-aminoanthracene (408), intermediate anthracen-2-ammonium chloride (406), 2-anthracene ammonium tetrachloroferrate (III) (404), and 2-anthracene ammonium trichlorocobaltate (II) (402) is depicted. The functional groups present in 2-anthracene ammonium tetrachloroferrate (III) (404) and 2-anthracene ammonium trichlorocobaltate (II) (402) MIL adsorbents were elucidated using the FTIR. From FIG. 4A, the broadband observed between 3100-3400 $cm^{-1}$ is characteristic of the N—H bond stretching vibrations in the adsorbents. The band seen at 2969.9 $cm^{-1}$ are C—H stretching vibrations due to the anthracene C—Hs. The skeletal vibrations of the rings are found at 1423.3 $cm^{-1}$ to 1650 $cm^{-1}$, while the broadband at 3300-3500 $cm^{-1}$ in (402) and (404) is characteristic of OH stretching vibration due to the hygroscopic nature of the chlorides of cobalt and iron. The characteristic behavior of the two MILs is considered similar and confirms the formation of the complex metal chlorides.

Figure 4B:
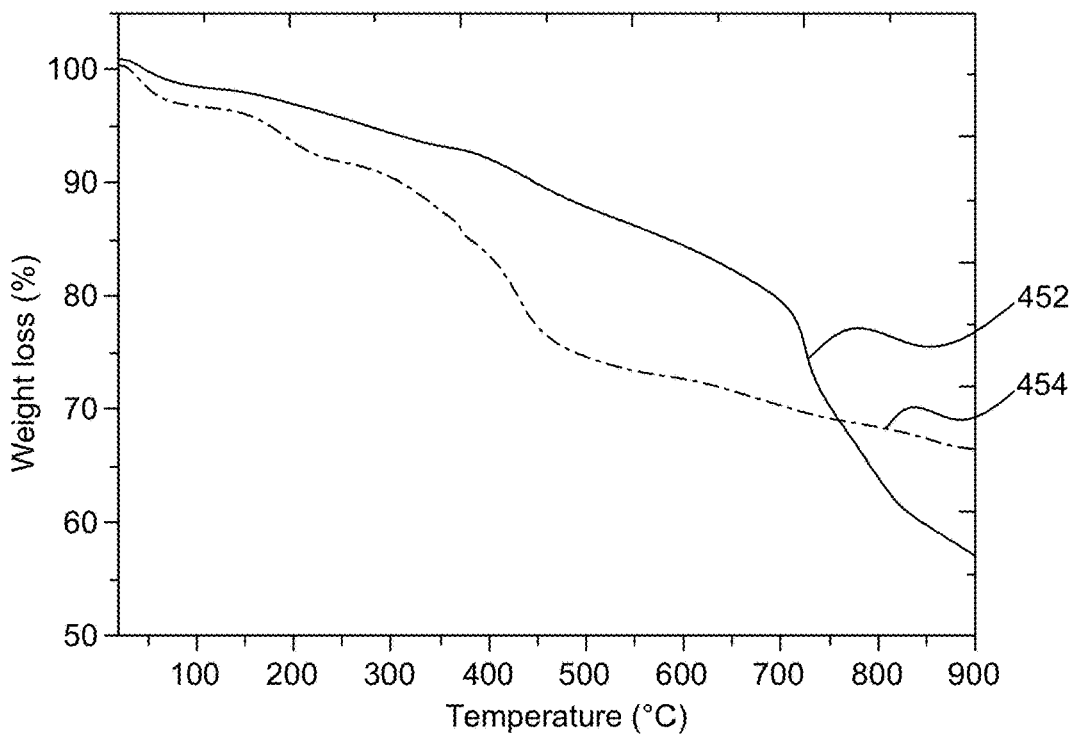
FIG. 4B shows a thermogravimetric analysis (TGA) decomposition curve of [2-AA] $FeCl_4$ and [2-AA] $CoCl_3$ according to certain embodiments.

Referring to FIG. 4B, a thermogravimetric (TGA) analysis of [2-AA] $CoCl_3$ (452) and [2-AA] $FeCl_4$ (454) MIL adsorbents is depicted. The TGA decomposition curve of both MILs shows a similar decomposition pattern, with gradual decomposition up to 400° C. for [2-AA]$CoCl_3$ and 500° C. for [2-AA] $FeCl_4$. The decomposition below these temperatures occurs in three steps—first at 70° C., which is ascribed to the melting point of the respective MILs, then at 150° C., which is assigned to the loss of hydrated water molecules, and the sharp decrease observed above 300° C. which is due to the decomposition of the respective MILs to form oxides. The synthesized MILs have shown remarkable thermal stability with less than 10% weight loss up to 300° C.

Figure 5A:
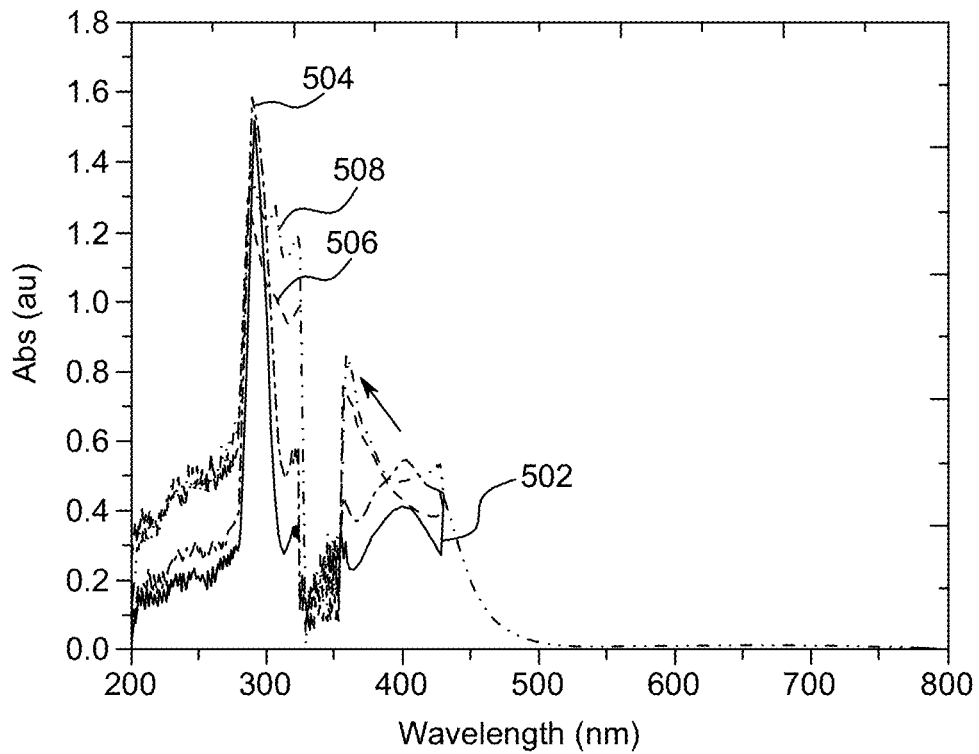
FIG. 5A shows UV-vis spectra of 2-aminoanthracene, intermediate anthracen-2-aminium chloride, 2-anthracene ammonium tetrachloroferrate (III), and 2-anthracene ammonium trichlorocobaltate (II), according to certain embodiments.

The UV/Vis spectra of [2-AA] $CoCl_3$ and [2-AA] $FeCl_4$-based MIL adsorbents were performed, and the results of this study are depicted in FIG. 5. Referring to FIG. 5A, superimposed UV-vis spectra of 2-aminoanthracene (502), anthracene-2-aminium chloride (504), 2-anthracene ammonium tetrachloroferrate (III) (506), and 2-anthracene ammonium trichlorocobaltate (II) (508) was presented in FIG. 5A. It was observed that all the spectra have a similar pattern. However, the [2-AA] $CoCl_3$ and [2-AA] $FeCl_4$ MIL adsorbents show sharp and well-resolved hypochromic shifts from 400 nm to 362 nm (indicated by the arrow). This can be associated with the stiffness introduced into the rings and confirms the formation of the corresponding complexes.

Figure 5B:
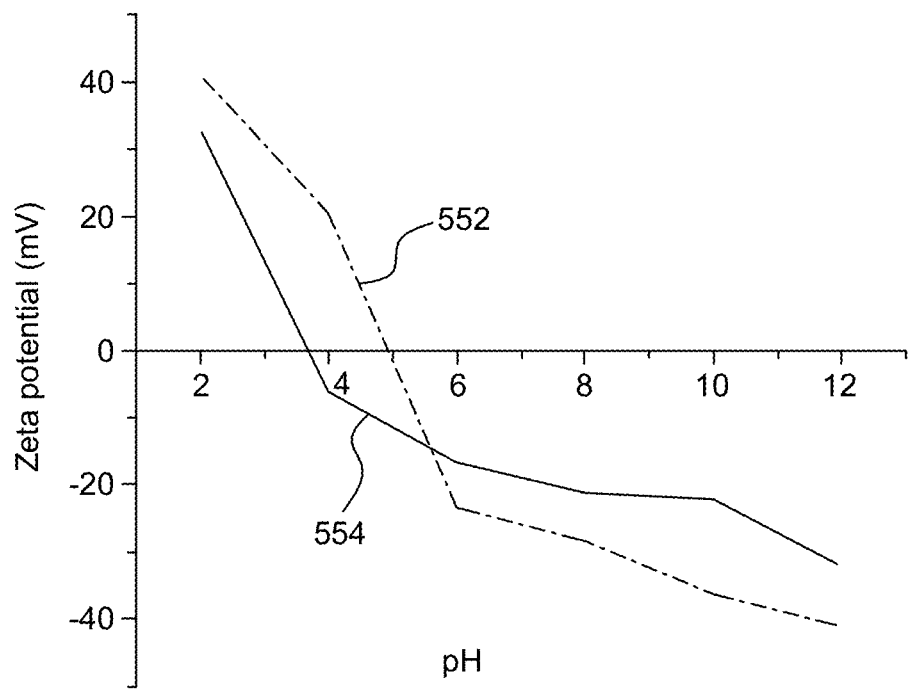
FIG. 5B shows the zeta potential of MIL, 2-anthracene ammonium tetrachloroferrate (III), and 2-anthracene ammonium trichlorocobaltate (II), according to certain embodiments.

Referring to FIG. 5B, a zeta potential of [2-AA] $CoCl_3$ (552) and [2-AA] $FeCl_4$ (554) based MIL adsorbents is illustrated. The result of zeta potential measurement at different pHs is shown in FIG. 5B. The results indicate that by increasing the pH above the isoelectric point of 3.8 and 5.0, the interaction of the cationic moiety, anthracene-2-ammonium, with the alkaline medium decreases, which is due to the repulsive forces generated by the negative charges of the basic medium and $FeCl^{4-}$ and similar behavior is observed in the [2-AA] $CoCl_3$ (552) and [2-AA]$FeCl_4$ (554) based MIL adsorbents. This indicates that the particles have both positive and negative charges. The higher zeta potential (mV) values obtained are due to the presence of the aromatic rings.

The magnetization properties of [2-AA] $CoCl_3$ and [2-AA] $FeCl_4$-based MIL adsorbents are depicted in FIG. 6. The magnetization of [2-AA] $FeCl_4$ as a function of the applied magnetic field at a temperature range of 10K (602), 50K (604), 100K (606), and 300K (608) is depicted in FIG. 6A; and the magnetization of [2-AA] $CoCl_3$ as a function of the applied magnetic field at a temperature of 5K (622), 10K (624), 50K (626), 100K (628), and 300 K (630), is depicted in FIG. 6B. The magnetization study indicates that [2-AA] $FeCl_4$ is ferromagnetic while is [2-AA]$CoCl_3$ superparamagnetic, as shown by the S-shaped curve in FIGS. 6A and 6B, respectively. The superparamagnetic property of [2-AA] $CoCl_3$ is attributed to the crystallite size reduction, which decreases the anisotropy energy, favoring the material's superparamagnetic property. In addition, high saturation magnetization and high two-curie temperature of cobalt-containing MIL can be due to the allotropic characteristics of the element. In the case of [2-AA], $FeCl_4$, which has depicted ferromagnetic properties, can be associated with the presence of iron with a curie point at 770° C. and changes its crystalline structure above the curie point.

The magnetization of [2-AA] $CoCl_3$ as a function of temperature in an applied magnetic field range of −0.2 Oe (652), 50 Oe (654), and 1000 Oe (656) is depicted in FIG.

Figure 6A:
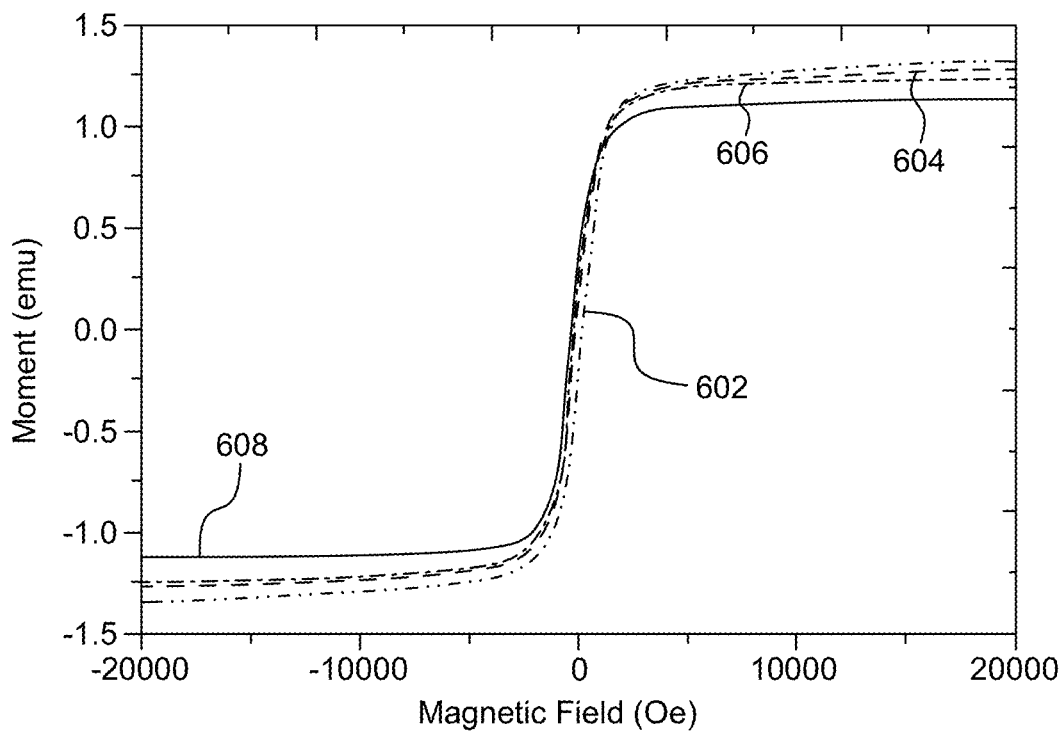
FIG. 6A shows the magnetization of [2-AA] $FeCl_4$ as a function of the applied magnetic field at a temperature range of 10-300 K, according to certain embodiments.
Figure 6B:
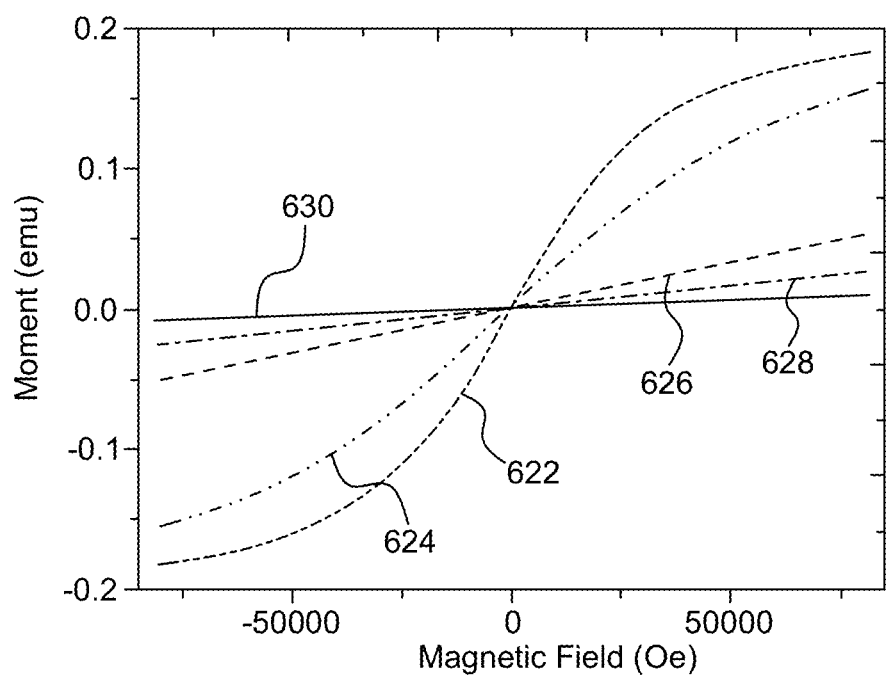
FIG. 6B shows the magnetization of [2-AA] $CoCl_3$ as a function of the applied magnetic field at a temperature of 5-300 K, according to certain embodiments.
Figure 6C:
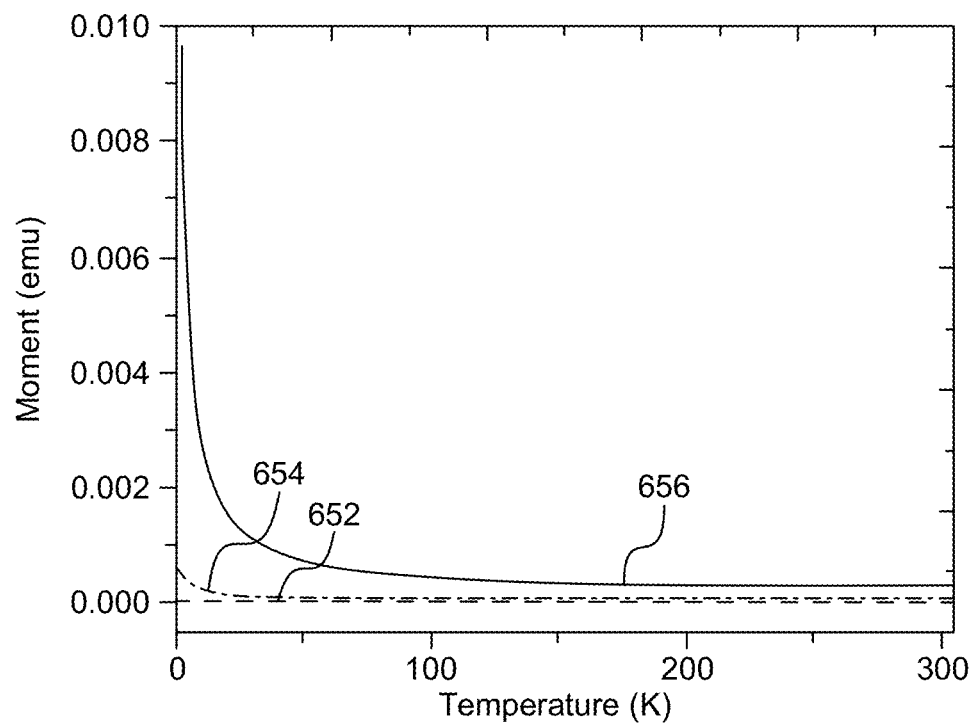
FIG. 6C shows magnetization of [2-AA] $CoCl_3$ as a function of temperature in an applied magnetic field range of −0.2-1000 Oe, according to certain embodiments.
Figure 6D:
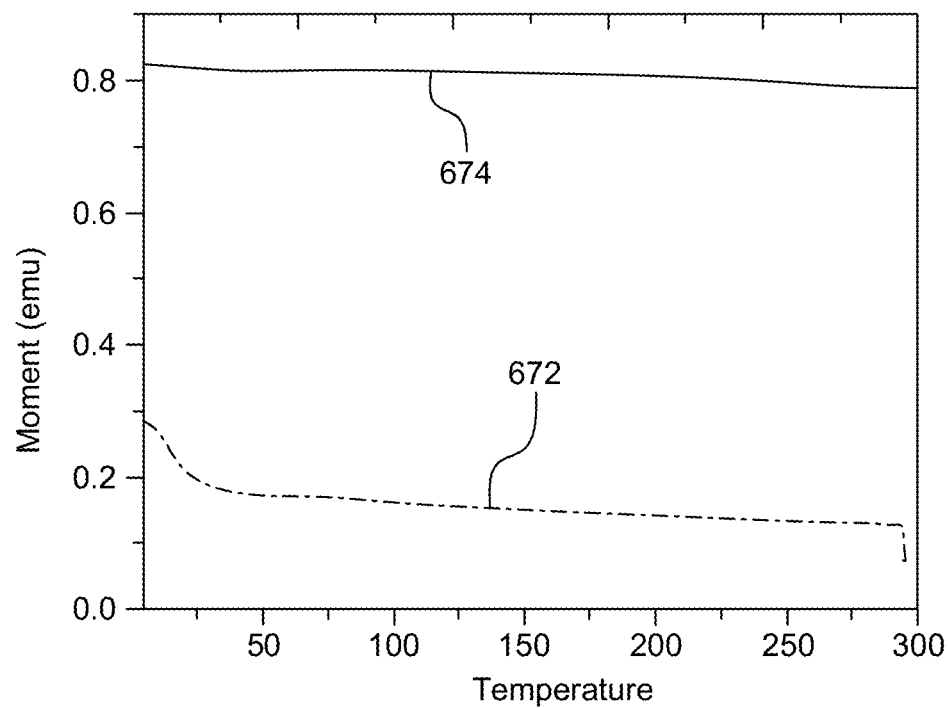
FIG. 6D shows magnetization of [2-AA] $FeCl_4$ as a function of temperature under an applied magnetic field of 50-1000 Oe, according to certain embodiments.
Figure 7A:
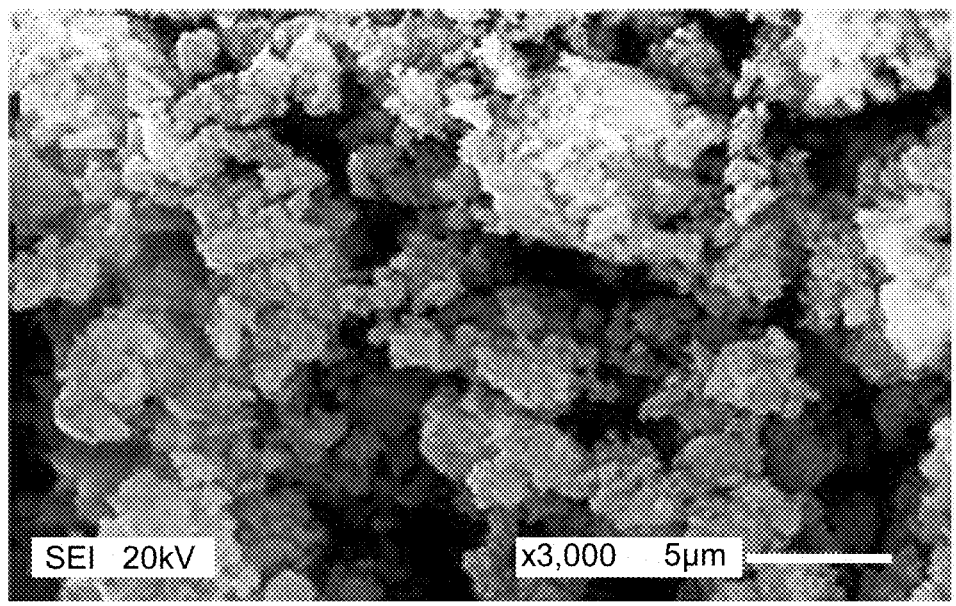
FIG. 7A shows scanning electron microscope (SEM) micrographs of [2-AA] $CoCl_3$ MIL adsorbent before absorption, according to certain embodiments.
Figure 7B:
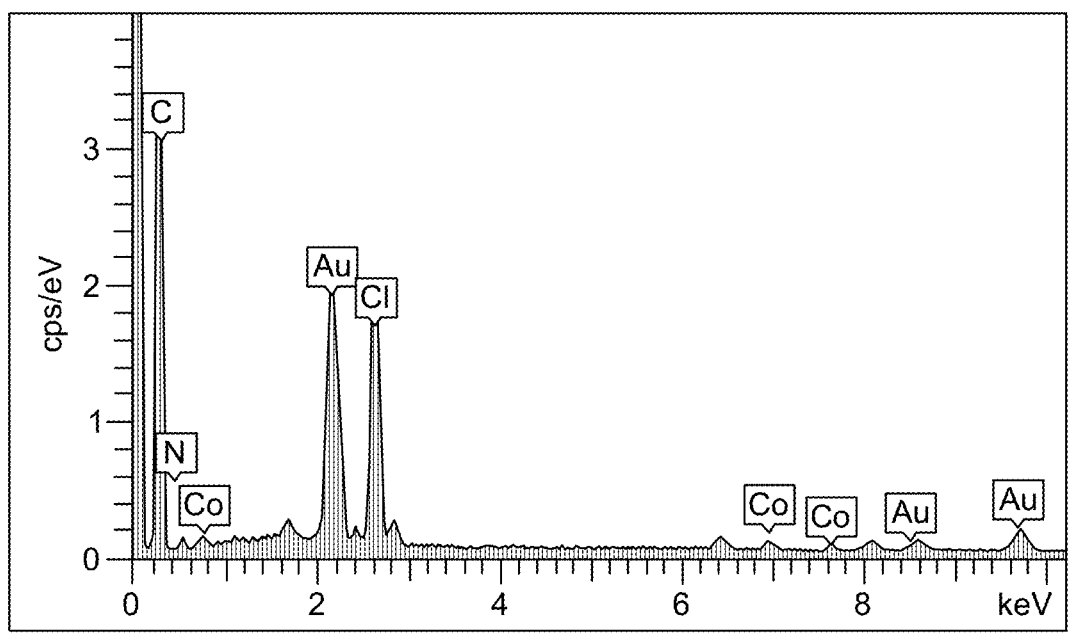
FIG. 7B shows energy dispersive X-ray diffractogram (EDX) images of [2-AA] $CoCl_3$ MIL adsorbent before absorption in 5 μm magnification, according to certain embodiments.
Figure 7C:
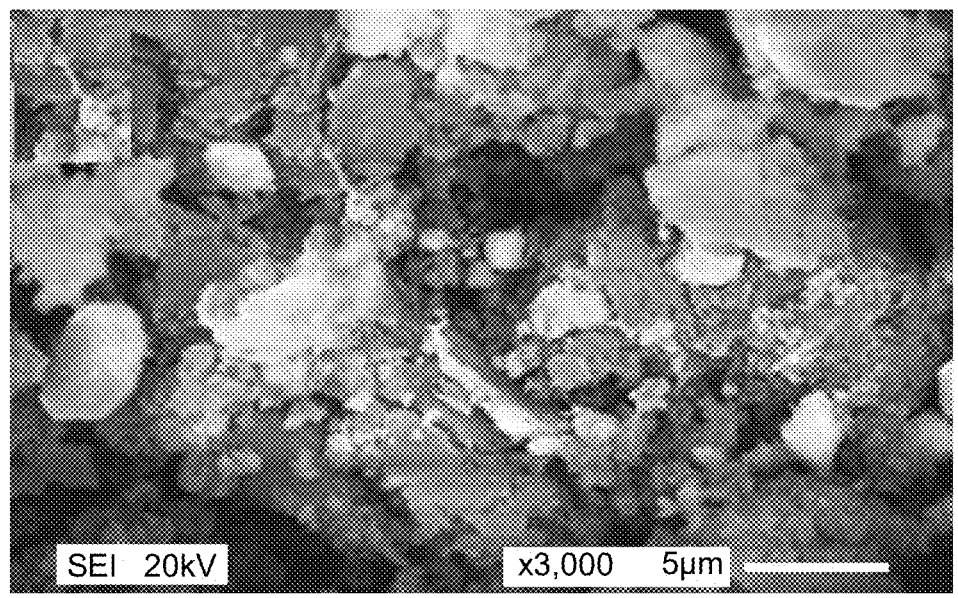
FIG. 7C shows SEM micrographs of [2-AA] $CoCl_3$ MIL adsorbent after absorption, according to certain embodiments.
Figure 7D:
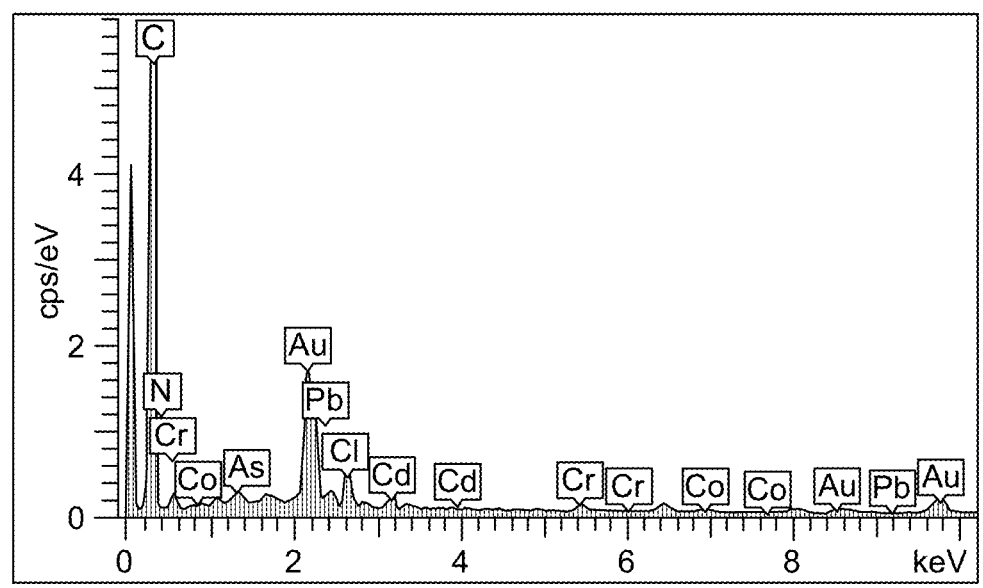
FIG. 7D shows EDX images of [2-AA] $CoCl_3$ MIL adsorbent after absorption in 5 μm magnification, according to certain embodiments.

6C; and the magnetization of [2-AA] FeCl$_4$ as a function of temperature under an applied magnetic field of 50 Oe (672) and 1000 Oe (674) is depicted in FIG. 6D. It can be observed that in both the samples, i.e., [2-AA] CoCl$_3$ and the [2-AA] FeCl$_4$, the temperature is directly proportional to the magnetic moment (FIGS. 6C and 6D), which agrees with Curie-Weiss law. Furthermore, a linear relationship between the magnetic field and the magnetization has been recorded and obtained at room temperature, indicating that both MILs are magnetic. The magnetic susceptibility was 1.17 and 1.16 for [2-AA] FeCl$_4$ and [2-AA] CoCl$_3$. This implies that both MILs have magnetic properties attributed to iron and cobalt due to their structures which allow their electrons to line up more easily, forming the magnetic field of the materials.

The morphological examination of [2-AA] CoCl$_3$-based MIL adsorbent was performed, and the results of this study are presented in FIG. 7. Adsorbents are in a form of irregular shaped and aggregated nanoflakes having an average thickness of 0.1 to 20 μm, with 0.1 to 20 μm diameters of holes. The SEM image of [2-AA] CoCl$_3$ based MIL before adsorption shows microparticle sizes with a non-spherical, irregular shape, generally with fine texture, and non-uniform surface morphology (FIG. 7A). The thicker crystal-like structure with irregular shapes and aggregated nanoflakes having an average thickness of 1 to 20 μm, with 0.1 to 6 μm diameters of holes observed after adsorption (FIG. 7B) is probably due to the adsorbed heavy metal ions on the surface of the [2-AA] CoCl$_3$-based MIL adsorbent. In addition, the EDX spectrum shown in (FIG. 7C) confirms the presence of all the expected elements in their stoichiometric weight percentages in the [2-AA] CoCl$_3$-based MIL adsorbent, while the EDX spectrum shown in FIG. 7D confirms the adsorption of the targeted heavy metal ions on the surface of [2-AA] CoCl$_3$ MIL adsorbent after the adsorption process.

The adsorption capacity of MIL adsorbents was studied, and the results of this study are illustrated in FIG. 8A. The adsorption of heavy metal ions (Cd$^{2+}$, As$^{3+}$, Pb$^{2+}$, and Cr$^{3+}$) was studied using 10 mg of either [2-AA] CoCl$_3$ or [2-AA] FeCl$_4$ based MIL adsorbents dispersed in 10 mL, of metal ions containing solution (50 ppm each) and stirred for 24 h contact time producing 0 to 5 ppm concentration of metal ions containing solutions. To elaborate, the effect of [2-AA] FeCl$_4$ based MIL adsorbent on heavy metal ions was studied using 10 mg of [2-AA]FeCl$_4$ based MIL adsorbent in 10 mL of Cd$^{2+}$ (802), As$^{3+}$ (804), Pb$^{2+}$ (806), and Cr$^{3+}$ (808) containing solution. Similarly, the effect of [2-AA] FeCl$_4$ based MIL adsorbent on heavy metal ions was studied using 10 mg of [2-AA] CoCl$_3$ based MIL adsorbent in 10 mL of Cd$^{2+}$ (822), As$^{3+}$ (824), Pb$^{2+}$ (826), and Cr$^{3+}$ (828) containing solution, respectively. The results indicate that both adsorbents ([2-AA] CoCl$_3$ or [2-AA] FeCl$_4$ have preferentially removed the targeted metal ions with adsorption capacity in the range of 5.73-55.5 mg/g for [2-AA] FeCl$_4$ and 23.6-56.8 mg/g for [2-AA] CoCl$_3$. The stability against hydrolysis coming from carbon bond and cobalt bond in [2-AA] CoCl$_3$ is considered responsible for the relatively higher adsorption performance of the [2-AA] CoCl$_3$ when compared to the [2-AA] FeCl$_4$ counterpart, and this can be attributed to d(z2) orbital which is occupied. Both adsorbents have shown higher selectivity towards As$^+$, Pb$^{2+}$, and Cr$^{3+}$ with stronger binding sites than Cd$^{2+}$.

Further, the effect of [2-AA] CoCl$_3$ dosage on its adsorption capacity was studied, and the results of this study are depicted in FIG. 8I. The effect of [2-AA] CoCl$_3$ dosage on its adsorption capacity to remove Cd$^{2+}$, As$^{3+}$, Pb$^{2+}$, and Cr$^{3+}$ was studied by varying the adsorbent dosage from 3-30 mg, particularly 3 mg, 5 mg, 10 mg, 20 mg, and 30 mg. To elaborate, the effect of [2-AA] CoCl$_3$ dosage on its adsorption capacity to remove Cd$^{2+}$ was studied with the adsorbent dosage of 3 mg (832), 5 mg (834), 10 mg (836), 20 mg (838), and 30 mg (840). Similarly, the effect of [2-AA] CoCl$_3$ dosage on its adsorption capacity to remove As$^{3+}$ was studied with the adsorbent dosage of 3 mg (842), 5 mg (844), 10 mg (846), 20 mg (848), and 30 mg (850). Further, the effect of [2-AA] CoCl$_3$ dosage on its adsorption capacity to remove Pb$^{2+}$ was studied with the adsorbent dosage of 3 mg (852), 5 mg (854), 10 mg (856), 20 mg (858), and 30 mg (860). Furthermore, the effect of [2-AA] CoCl$_3$ dosage on its adsorption capacity to remove Cr$^{3+}$ was studied with the adsorbent dosage of 3 mg (862), 5 mg (864), 10 mg (866), 20 mg (868), and 30 mg (870). The adsorption experiment was carried out by dispersing the adsorbent in a 10 mL solution of 100 ppm each of metal ions, then stirring for 24 h contact time. From FIG. 8B, it can be observed that the percent removal of the heavy metals increases with an increase in the dosage up to 30 mg. However, the adsorption capacity (which factors in the mass of the adsorbent, as shown in equation (1)) increases from 3 to 5 mg. However, an increase in concentrations beyond 5 mg decreases the absorption capacity up to 30 mg (FIG. 8B). Further experiments were conducted with the adsorbent dosage of 5 mg.

Figure 9:
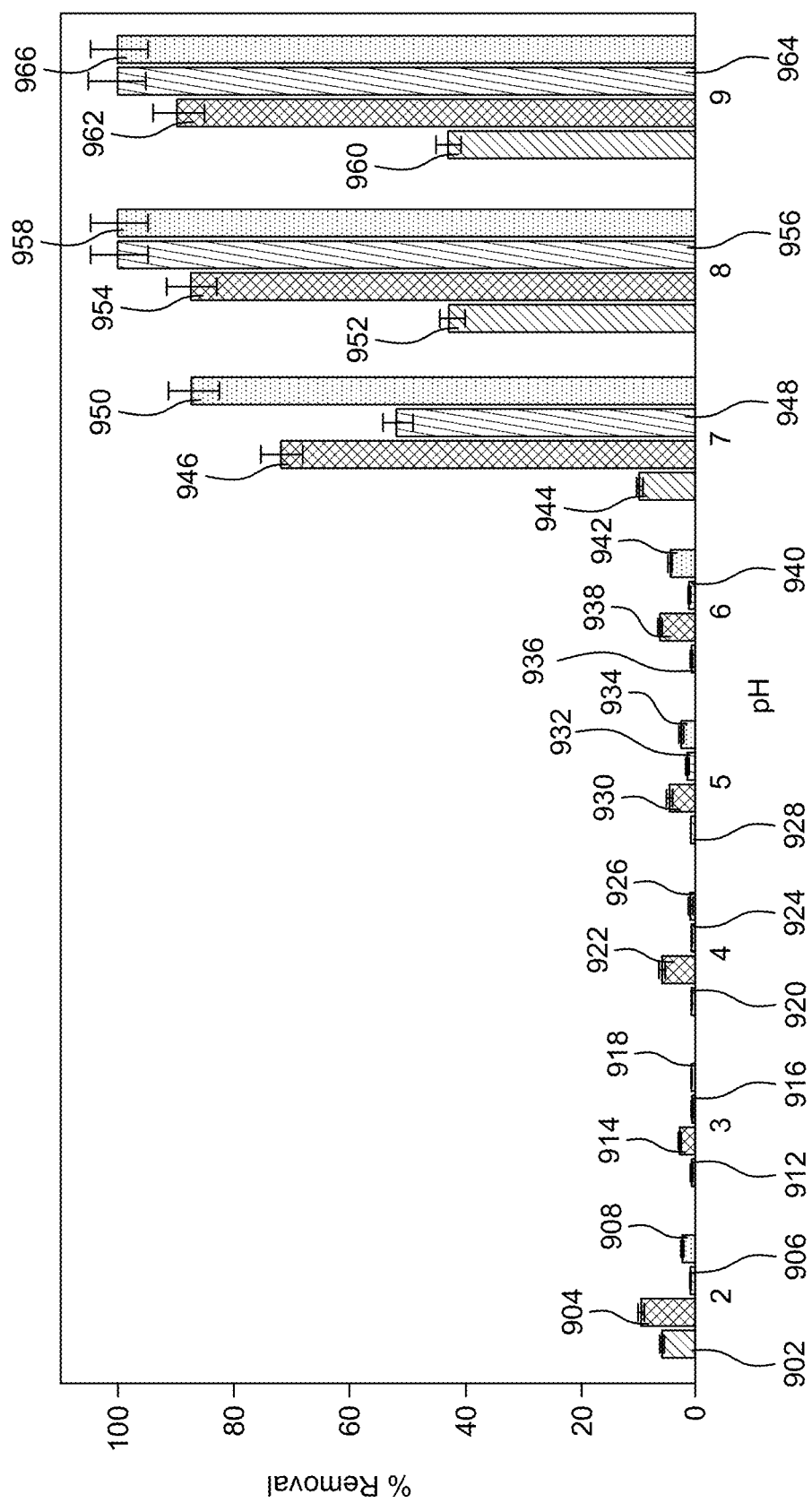
FIG. 9 shows the effect of solution pH on the adsorption of the metal ions by the [2-AA] $CoCl_3$ MIL, according to certain embodiments.

Further, the effect of solution pH on the adsorption efficiency of [2-AA] CoCl$_3$ was studied, and the results are depicted in FIG. 9. The pH1 plays a significant role in the adsorption capacity. It can affect the metal speciation through the hydrolysis reaction and the electrostatic interaction between the adsorbent and the adsorbate. A wide pH range (2-9) was investigated in the adsorption experiments. The adsorption efficiency of Cd$^{2+}$, As$^{3+}$, Pb$^{2+}$, and Cr$^{3+}$ at pH 2 (902, 904, 906, 908), pH 3 (912, 914, 916, 918), pH 4 (920, 922, 924, 926), pH 5 (928, 930, 932, 934), pH 6 (936, 938, 940, 942), pH 7 (944, 946, 948, 950), pH 8 (952, 954, 956, 958), and pH 9 (960, 962, 964, 966) was investigated. As shown in FIG. 9, the adsorption efficiency of [2-AA] CoCl$_3$ increases with an increase in the pH, especially for Pb$^{2+}$ and Cr$^{3+}$, where the percentage removal was more than 99% at pH 8 and 9 without major differences. However, increasing the pH to 9 resulted in the precipitation of the metal ions. Further experiments were performed at pH 8. The pH result agrees with the isoelectric point of MIL, which shows a larger negative charge on the surface above pH 5, as shown in FIG. 5B. This favors the electrostatic interaction between the cationic species and the large negative adsorption sites. In contrast, at lower pH, the MIL exhibits positive active sites, which produce unfavorable electrostatic interaction that causes repulsion between the cationic metal ions and the positively charged surface of MIL. Therefore, it can be understood that the electrostatic interaction is the dominant factor affecting the adsorption behavior of the metal ions.

Figure 10:
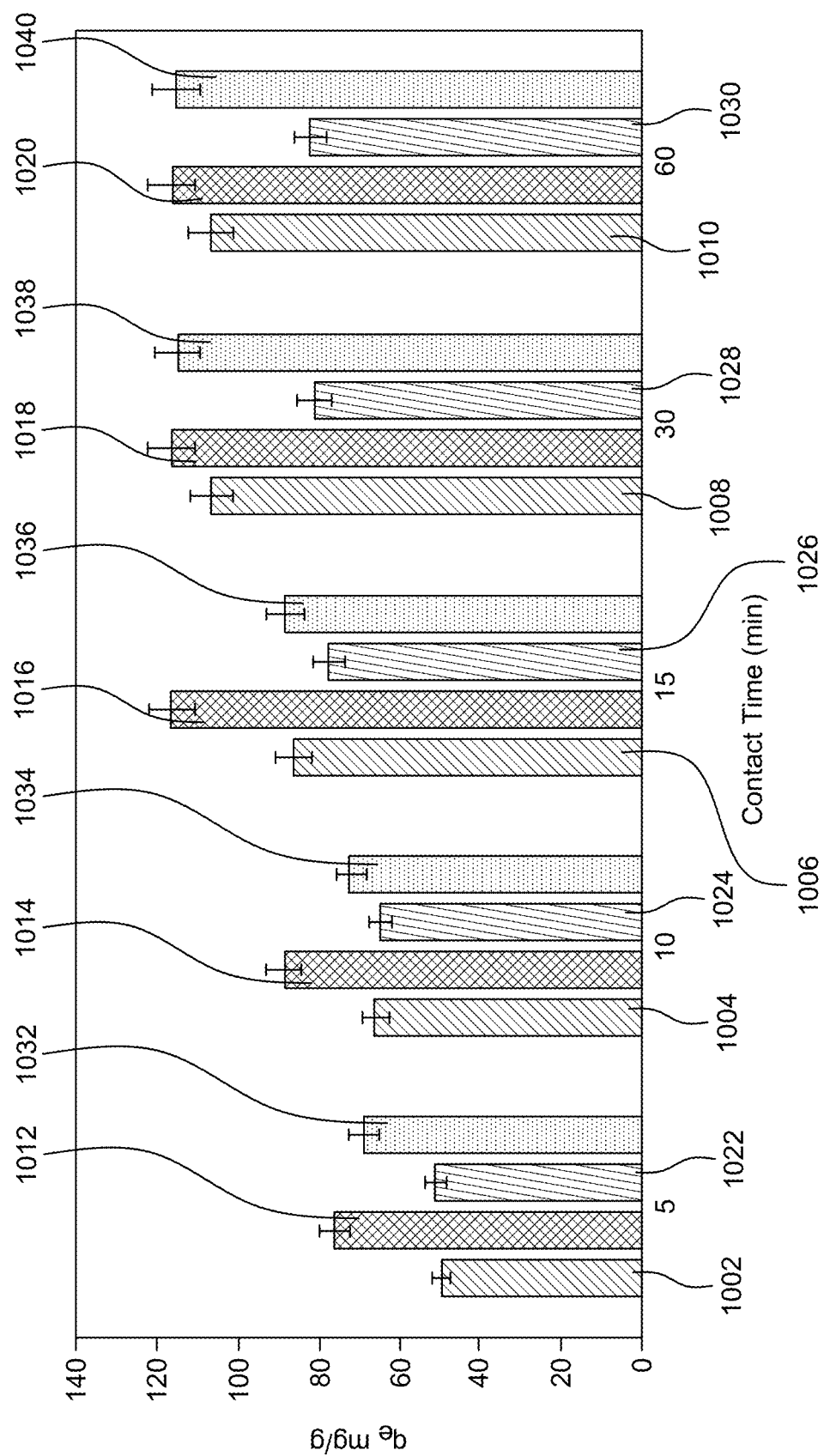
FIG. 10 shows the effects of contact time on the adsorption of the heavy metal ions by the [2-AA] $CoCl_3$ MIL, according to certain embodiments.

Further, the effect of contact time on the adsorption efficiency of [2-AA] CoCl$_3$ was studied, and the results of this study are depicted in FIG. 10. The absorption efficiency was studied at 5, 10, 15, 30, and 60 minutes. The adsorption efficiency of Cd$^{2+}$, As$^{3+}$, Pb$^{2+}$, and Cr$^{3+}$ at 5 minutes (1002, 1012, 1022, 1032), 10 minutes (1004, 1014, 1024, 1034), 15 minutes (1006, 1016, 1026, 1036), 30 minutes (1008, 1018, 1028, 1038), and 60 minutes (1010, 1020, 1030, 1040) was investigated. The contact time between the [2-AA] CoCl$_3$ MIL and metal ions in the solution affects the adsorption efficiency of the adsorbent. As observed in FIG. 10, the adsorption capacity increases with contact time from 5 minutes to 30 minutes. Further increase in contact time to 60 minutes does not increase the adsorption efficiency. However, contact time beyond 60 minutes decreased the adsorption capacity for some of the heavy metal ions. This behavior can be attributed to the saturation of the pores of the adsorbent or gradual ionization leading to the formation of OH. Further absorption experiments were conducted at 60 min to save energy and time.

Figure 11:
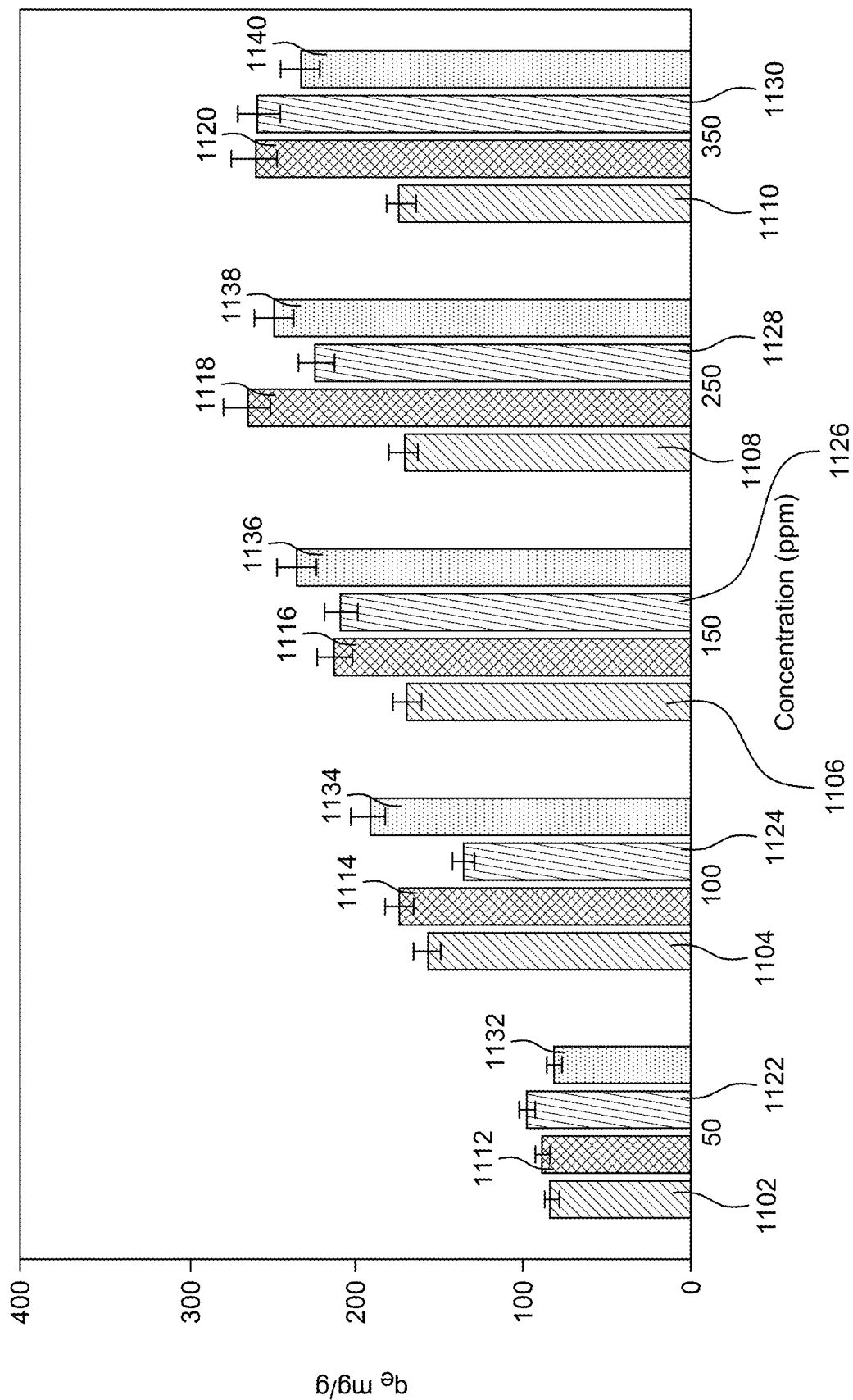
FIG. 11 shows the effects of different initial concentrations of each of the targeted metal ions on their adsorption by [2-AA] $CoCl_3$ MIL, according to certain embodiments.

Further, the effect of metal ions concentration on the adsorption capacity of [2-AA]$CoCl_3$ was studied, and the results of this study are presented in FIG. 11. Generally, the metal ions concentration affects the adsorption capacity of adsorbents (equation 1). The effect of metal ions concentration was studied by varying the initial concentrations of the ions from 50 to 350 mg/L, particularly at 50, 100, 150, 250, and 300 ppm, respectively. The adsorption efficiency of $Cd^{2+}$, $As^{3+}$, $Pb^{2+}$, and $Cr^{3+}$ at 50 ppm (1102, 1112, 1122, 1132), 100 ppm (1104, 1114, 1124, 1134), 150 ppm (1106, 1116, 1126, 1136), 250 ppm (1108, 1118, 1128, 1138), and 300 ppm (1110, 1120, 1130, 1140) was investigated. The results show that the adsorption capacity of [2-AA] $CoCl_3$ increases with the concentration of metal ions up to 250 ppm (FIG. 11). Further increase in concentration beyond 250 ppm results in a decrease in adsorption capacity. This phenomenon may be due to the saturation of the active sites on the MIL. Based on the results, the adsorption capacity between 171-265 mg/g was recorded for the heavy metal ions.

The adsorption processes of the $Cd^{2+}$, $As^{3+}$, $Pb^{2+}$, and $Cr^{3+}$ heavy metal ions on the [2-AA] $CoCl_3$ adsorbent were better understood using kinetic adsorption parameters. These parameters are typically derived from the pseudo-first-order and pseudo-second-order kinetic models mathematically expressed by the Lagergren rate equation (2) and the Ho and McKay rate equation (3).

$$\ln(q_e - q_t) = \ln q_e - k_1 t \quad (2)$$

$$\frac{t}{q_t} = \frac{1}{k_2 q_e^2} + \frac{t}{q_e} \quad (3)$$

Figure 12A:
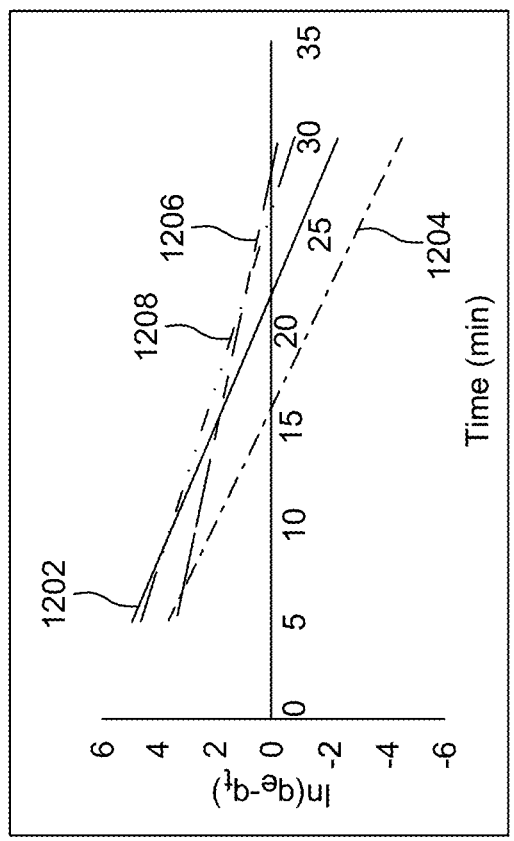
FIG. 12A shows pseudo-first-order plots for the targeted metal ions adsorption on [2-AA] $CoCl_3$ MIL, according to certain embodiments.

The $q_t$ (mg/g) and $q_e$ (mg/g) denote the amount of metal ions adsorbed at time t (min) and equilibrium, respectively. Similarly, the $k_1$ ($min^{-1}$) and $k_2$ (g/mg·min) denote the pseudo-first-order and pseudo-second-order rate constants. If the adsorption processes for the heavy metal ions $Cd^{2+}$ (1202), $As^{3+}$ (1204), $Pb^{2+}$ (1206), and $Cr^{3+}$ (1208) by [2-AA] $CoCl_3$ follow the pseudo-first-order kinetic model, the plot of $\ln(q_e-q_t)$ versus t (min) shown in FIG. 12A was expected to give a straight line with an intercept of $\ln q_e$ and slope of $-k_1$.

Figure 12B:
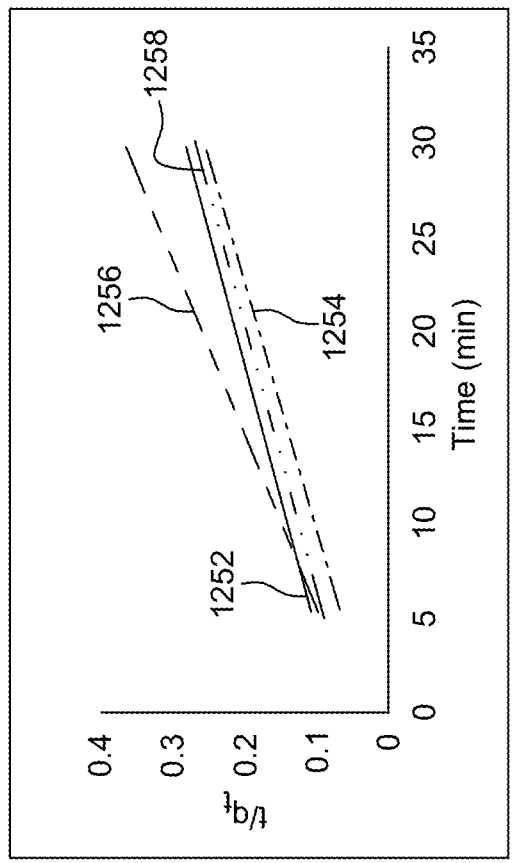
FIG. 12B shows pseudo-second-order plots for the targeted metal ions adsorption on [2-AA] $CoCl_3$ MIL, according to certain embodiments.

Similarly, if the adsorption processes proceeded via the pseudo-second-order kinetics, then the plot of $t/q_t$ versus t (min) presented in FIG. 12B was expected to give a straight line with an intercept of $1/k_2 q_e^2$ and slope of $1/q_e$. Therefore, the obtained slopes and intercepts from the respective pseudo-first-order and pseudo-second-order plots were used to calculate the kinetic parameters $k_1$, $k_2$, and theoretical (cal) summarized in Table 1. Consequently, the higher $R^2$ values for the pseudo-second-order plots for all the heavy metal ions, $Cd^{2+}$ (1252), $As^{3+}$ (1254), $Pb^{2+}$ (1256), and $Cr^{3+}$ (1258), adsorption on the [2-AA] $CoCl_3$ indicate that the adsorption processes proceeded via the pseudo-second-order pathway; thus, the process is controlled by the physisorption mechanism. Based on this, it may be inferred that the interaction between the heavy metal ions and [2-AA] $CoCl_3$ is electrostatic between electron-rich sites of the adsorbent and the metal ions. In addition, the closeness of experimental adsorption capacity ($q_e$(expt)) with the pseudo-second-order calculated adsorption capacity ($q_e$(cal)) corroborates that the adsorption processes proceeded via the pseudo-second-order pathway.

TABLE 1

Kinetic parameters for adsorption of heavy metal ions by [2-AA] CoCl3 MIL

| | Pseudo first order | | | | Pseudo second order | | |
|---|---|---|---|---|---|---|---|
| Ion | $q_e$ (exp) (mg/g) | $k_1$ ($min^{-1}$) | $q_e$ (cal) (mg/g) | $R^2$ | $k_2(10^4)$ (g/mg · min) | Qe (cal) (mg/g) | $R^2$ |
| Cd | 106.6 | 0.286 | 544 | 0.9352 | 6.84 | 142.8 | 0.992 |
| As | 116.4 | 0.325 | 190 | 0.8682 | 20.6 | 131.6 | 0.9876 |
| Pb | 82 | 0.14 | 56.8 | 0.9634 | 28.8 | 91.7 | 0.9964 |
| Cr | 115.2 | 0.215 | 284 | 0.9142 | 9.35 | 140.8 | 0.9673 |

The adsorption isotherm studies were carried out to gain insight into the nature of the interaction between the [2-AA] $CoCl_3$ adsorbent and the heavy metal ions. The Langmuir and Freundlich isotherms models expressed by linear equations (4) and (5) respectively were used.

$$\frac{C_e}{q_e} = \frac{1}{K_L q_m} + \frac{C_e}{q_m} \quad (4)$$

$$\ln q_e = \ln K_F + \frac{1}{n} \ln C_e \quad (5)$$

$C_e$ (mg/L) and $q_e$ (mg/g) denote the equilibrium concentration of adsorbate and adsorption capacity of the adsorbent, respectively. $K_L$ and $q_m$ indicate Langmuir equilibrium constant and the maximum adsorption capacity of the adsorbent, respectively. $K_F$ and n are Freundlich constants for a given adsorbate and adsorbent.

Figure 13A:
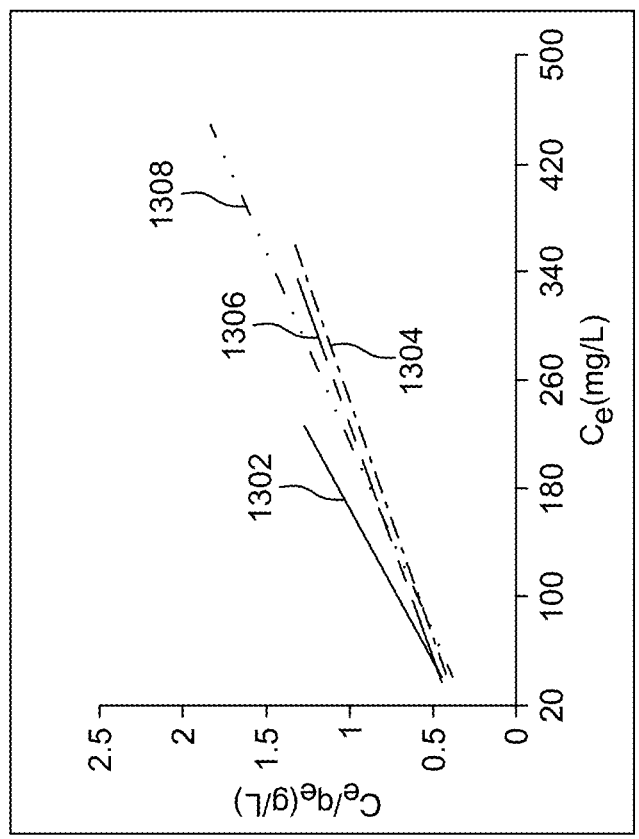
FIG. 13A shows Langmuir for the targeted metal ions adsorption on [2-AA] $CoCl_3$, according to certain embodiments.

The Langmuir isotherm model assumes that the adsorption of the heavy metal ions occurs homogeneously on the surface of the [2-AA] $CoCl_3$ adsorbent using specific adsorption sites and energies. This model considered that steric hindrances and lateral interactions between adsorbate (heavy metal ions in this case) are not significant. Contrarily, the Freundlich isotherm model presumes that the adsorption of the heavy metal ions occurs heterogeneously, resulting in uneven distribution of adsorption energies over the [2-AA] $CoCl_3$ adsorption surfaces. Therefore, by plotting $C_e/q_e$ against $C_e$ for the heavy metal ions $Cd^{2+}$ (1302), $As^{3+}$ (1304), $Pb^{2+}$ (1306), and $Cr^{3+}$ (1308) using equation (4), to get a slope equal to $1/q_m$ and intercept of $1/K_L q_m$ (FIG. 13A), the $K_L$, which relates directly with adsorption energy, and $q_m$, which signifies the monolayer adsorption capacity, can both be determined.

Figure 13B:
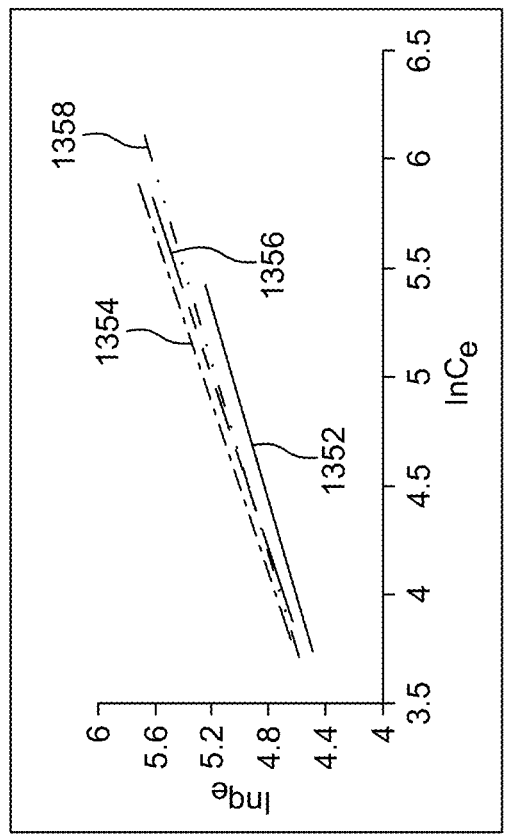
FIG. 13B shows Freundlich isotherms for the targeted metal ions adsorption on [2-AA] $CoCl_3$ MIL, according to certain embodiments.

Similarly, the plot of $\ln q_e$ against $\ln C_e$ (using equation 5) gives a slope equal to $1/n$ and intercept of $\ln K_F$ (FIG. 13B), and the constants n and $K_F$ for the heavy metal ions $Cd^{2+}$ (1352), $As^{3+}$ (1354), $Pb^{2+}$ (1356), and $Cr^{3+}$ (1358) adsorption is determined accordingly. The adsorption isotherm parameters are summarized in Table 2. Both models' correlation coefficient values ($R^2$) are used to evaluate the model that best fits the nature of the interaction between the [2-AA]$CoCl_3$ adsorbent and the heavy metal ions, $Cd^{2+}$ (1352), $As^{3+}$ (1354), $Pb^{2+}$ (1356), and $Cr^{3+}$ (1358). Consequently, the $R^2$ values of the Langmuir adsorption isotherm are more than the $R^2$ values of the Freundlich adsorption isotherm; thus, the heavy metal ions adsorption isotherm was best described by the Langmuir model, which implies that the adsorption occurs homogeneously on the surface of the [2-AA] $COCl_3$ adsorbent. In addition, the Langmuir model has shown that the [2-AA] $COCl_3$ adsorbent has demonstrated remarkable performance in removing these heavy metal ions with maximum adsorption capacity ($q_m$) in the range of 227-357 mg/g. The adsorption capacity of $Cd^{2+}$, $Pb^{2+}$, $As^{3+}$ and $Cr^{3+}$ onto [2-AA] $COCl_3$ adsorbent was compared with other adsorbents in literature (Table 3). The results suggest that [2-AA] $COCl_3$ adsorbent performs exceptionally well in the adsorption of $Cd^{2+}$, $Pb^{2+}$, $As^{3+}$, and $Cr^{3+}$ compared to the adsorbents earlier reported.

TABLE 2

Isotherm parameters for adsorption of heavy metal ions on [2-AA] $CoCl_3$ MIL

| | Langmuir isotherm | | | Freundlich isotherm | |
|---|---|---|---|---|---|
| | qm | KL($10^3$) | | | |
| Ion | (mg/g) | (L/mg) | $R^2$ | n | KF | R2 |
| Cd | 227.3 | 16.3 | 0.9789 | 2.22 | 16.6 | 0.9096 |
| As | 357.1 | 9.3 | 0.9705 | 1.94 | 14.7 | 0.8959 |
| Pb | 344.8 | 8.7 | 0.9875 | 2.05 | 15.8 | 0.9502 |
| Cr | 285.7 | 15 | 0.9677 | 2.2 | 18.1 | 0.8247 |

TABLE 3

Comparison of ([2-AA] $CoCl_3$) adsorbent with published work

| Adsorbent and method | Metal ion | Maximum adsorption capacities |
|---|---|---|
| A mixture of magnetic graphite oxide and sand as a medium in a fixed-bed column | Cd | 0.300 mmol/g |
| | Pb | 0.608 mmol/g |
| | Cr | 0.484 mmol/g |
| | As | 0.272 mmol/g |
| Cassava root husk-derived biochar loaded with ZnO nanoparticles | Cd | 44.27 mg/g |
| | Pb | 42.05 mg/g |
| | Cr | 39.52 mg/g |
| | As | 28.37 mg/g |
| Shanghai silty clay (SSC) | Cd | 8.90 mg/g |
| | Pb | 26.46 mg |
| | Cr | 1.85 mg/g |
| | As | 2.80 mg/g |
| 2-anthracene ammonium trichlorocobaltate (II) ([2-AA] $CoCl_3$)* | Cd | 227.3 mg/g |
| | Pb | 344.8 mg/g |
| | Cr | 285.7 mg/g |
| | As | 357.1 mg/g |

*Adsorbent of the present disclosure

Figure 14:
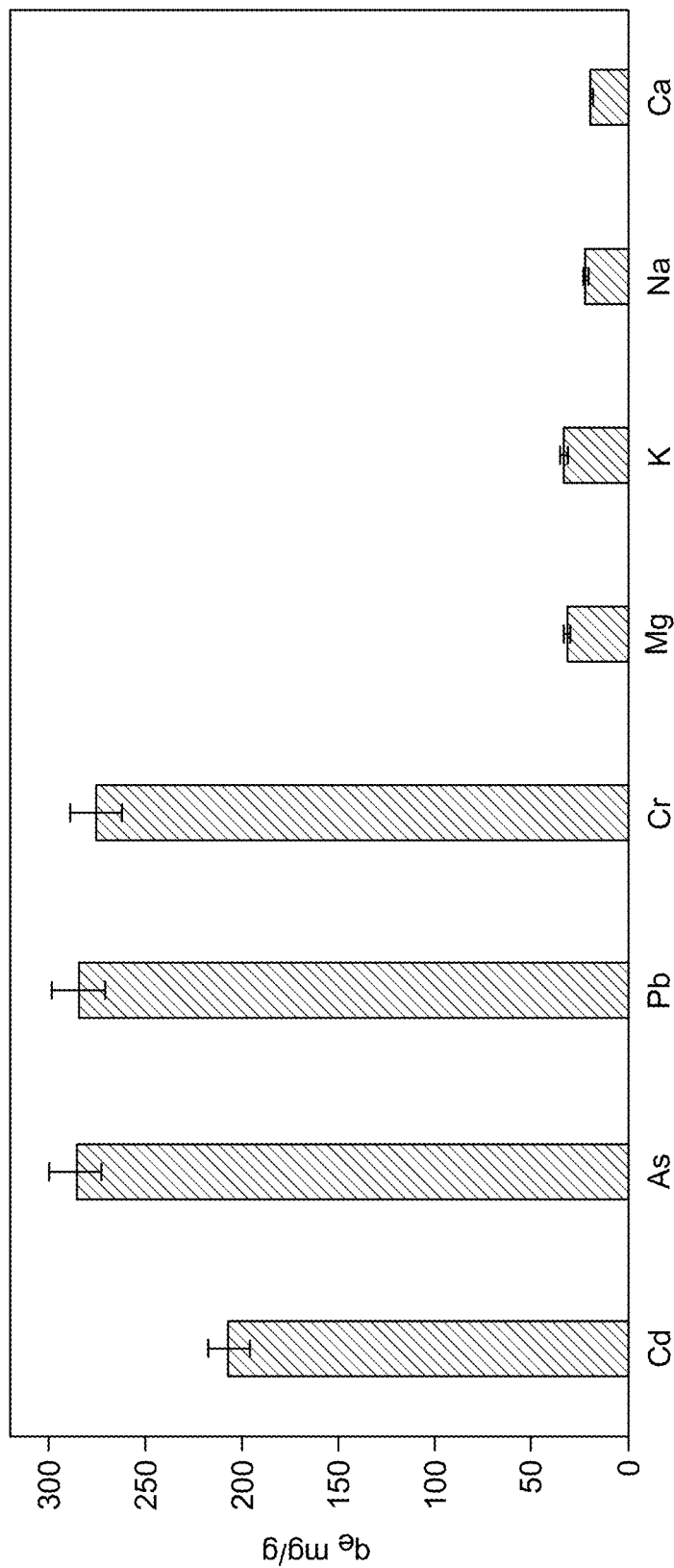
FIG. 14 shows selective adsorption of targeted metal ions by [2-AA] $CoCl_3$ in a mixed component solution, according to certain embodiments.

Further, the selectivity of [2-AA] $COCl_3$ for $Cd^{2+}$, $Pb^{2+}$, $As^{3+}$, and $Cr^{3+}$ was studied by introducing 150 ppm each of $Ca^{2+}$, $K^+$, $Na^+$, and $Mg^{2+}$ as competitive ions in the sample solution containing 150 ppm each of $Cd^{2+}$, $Pb^{2+}$, $As^{3+}$, and $Cr^{3+}$. It was observed that even in the presence of other competitive metal ions, the [2-AA] $CoCl_3$ exhibited superior adsorption performance $Cd^{2+}$, $Pb^{2+}$, $As^{3+}$ and $Cr^{3+}$ (FIG. 14), with adsorption capacity in the range of 206-286 mg/g. On the other hand, the adsorption capacity of $Ca^{2+}$, $K^+$, $Na^-$, and $Mg^{2+}$ was within 20-34 mg/g (Table 4).

The selectivity coefficient ($K_{M/M'}$) of [2-AA] $CoCl_3$ for the targeted heavy metal ions (M) over other competitive metal ions (M') is calculated using the equation (6):

$$K_{M/M'} = \frac{K_d(M)}{K_d(M')} \quad (6)$$

where $K_d$ signifies the distribution coefficient of the metal ions and is calculated using equation (7):

$$K_d = \left(\frac{C_o - C_e}{C_e}\right) * \frac{V}{m} \quad (7)$$

A significant value of $K_d$ implies large adsorption of the metal ion by adsorbent and vice-versa. Table 4 shows the $K_d$ values of all the ions, and it is observed that the $Cd^{2+}$, $Pb^{2+}$, $As^{3+}$, and $Cr^{3+}$ have larger Kd values, especially $As^{3+}$ (Kd=460 mL/g) than the $Ca^{2+}$, $K^+$, $Na^+$, and $Mg^{2+}$ ions. Similarly, the adsorption capacity of the targeted metal ions is in the range of 206-286 mg/g, while the adsorption capacity of the interfering ions is 20-34 mg/g. In addition, the selectivity coefficient ($K_{M/M'}$) of each of the targeted metal ions is 2-3 orders of magnitude higher than those of the interfering metal ions. This further confirms the high selectivity of [2-AA]$CoCl_3$ for the targeted heavy metal ions.

TABLE 4

Selective adsorption of targeted metal ions by [2-AA] $CoCl_3$

| Metal ions | Co (ppm) | Ce (ppm) | qe (mg/g) | Kd (mL/g) | KM/Mg | KM/K | KM/Na | KM/Ca |
|---|---|---|---|---|---|---|---|---|
| Cd | 138 | 35 | 206 | 5.88 | 22.8 | 22.5 | 34.8 | 39.4 |
| As | 143 | 0.62 | 285 | 460 | 1783 | 1760 | 2724 | 3080 |
| Pd | 147 | 4.65 | 284 | 61.2 | 237 | 234 | 362 | 410 |
| Cr | 141 | 3.57 | 275 | 77 | 299 | 295 | 456 | 516 |
| Mg | 145 | 129 | 33.2 | 0.26 | | | | |

TABLE 4-continued

Selective adsorption of targeted metal ions by [2-AA] CoCl$_3$

| Metal ions | Co (ppm) | Ce (ppm) | qe (mg/g) | Kd (mL/g) | KM/Mg | KM/K | KM/Na | KM/Ca |
|---|---|---|---|---|---|---|---|---|
| K | 146 | 129 | 33.8 | 0.26 | | | | |
| Na | 141 | 130 | 21.9 | 0.17 | | | | |
| Ca | 145 | 135 | 20.1 | 0.15 | | | | |

Regeneration Studies

Figure 15:
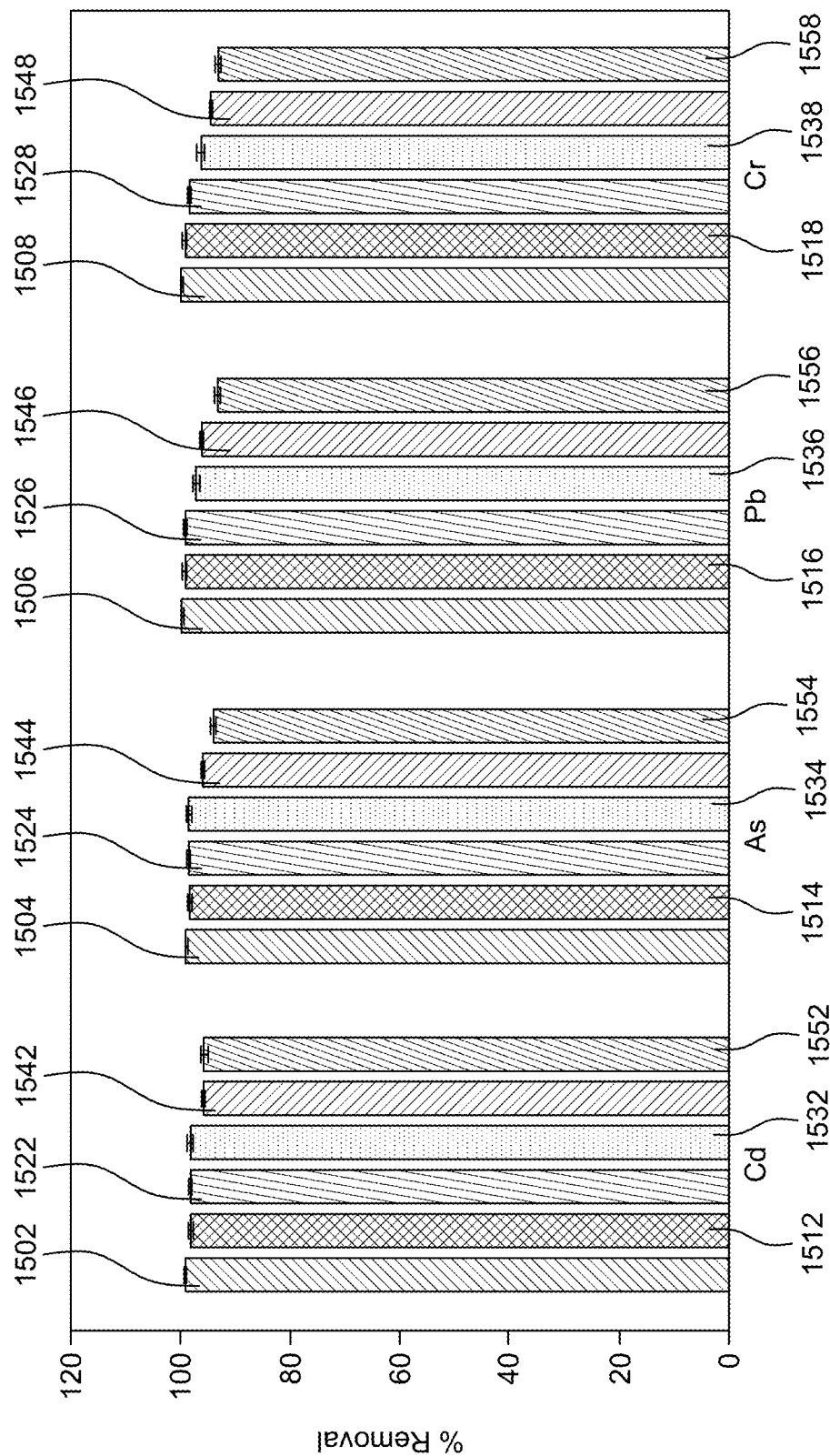
FIG. 15 shows the regeneration and reuse of MIL, [2-AA] $CoCl_3$ for 6 consecutive times for the adsorption of the metal ions Cd (II), As (II), Pb (II), and Cr (II) by using 1M $HNO_3$, according to certain embodiments.

Recycling the adsorbent was studied to evaluate the activity loss and possible reusability of the [2-AA] CoCl$_3$ MIL after using heavy metal ions adsorption. Thus, the adsorbent was recovered for re-use after the adsorption by centrifuging at 3500 rpm. Then, the adsorbent was washed thoroughly with 1M nitric acid at pH 3 until no residue of the metal ions was detectable in the supernatant solution. Finally, the adsorbent was dried at 50° C. before reuse. The adsorption efficiency of the [2-AA] CoCl$_3$-based MIL adsorbent for Cd$^{2+}$ for 1$^{st}$ cycle (1502), 2$^{nd}$ cycle (1512), 3$^{rd}$ cycle (1522), 4$^{th}$ cycle (1532), 5$^{th}$ cycle (1542), and 6$^{th}$ cycle (1552); for As$^{3+}$ 1$^{st}$ cycle (1504), 2$^{nd}$ cycle (1514), 3$^{rd}$ cycle (1524), 4$^{th}$ cycle (1534), 5$^{th}$ cycle (1544), and 6$^{th}$ cycle (1554); for Pb$^{2+}$—1$^{st}$ cycle (1506), 2$^{nd}$ cycle (1516), 3$^{rd}$ cycle (1526), 4$^{th}$ cycle (1536), 5$^{th}$ cycle (1546), and 6$^{th}$ cycle (1556); and Cr$^{3+}$—1$^{st}$ cycle (1508), 2$^{nd}$ cycle (1518), 3$^{rd}$ cycle (1528), 4$^{th}$ cycle (1538), 5$^{th}$ cycle (1548), and 6$^{th}$ cycle (1558), respectively, as depicted in FIG. 15. From the FIG. 15, it can be observed that the [2-AA] CoCl$_3$ MIL could be reused six times with excellent adsorption efficiency of more than 93%.

Figure 16:
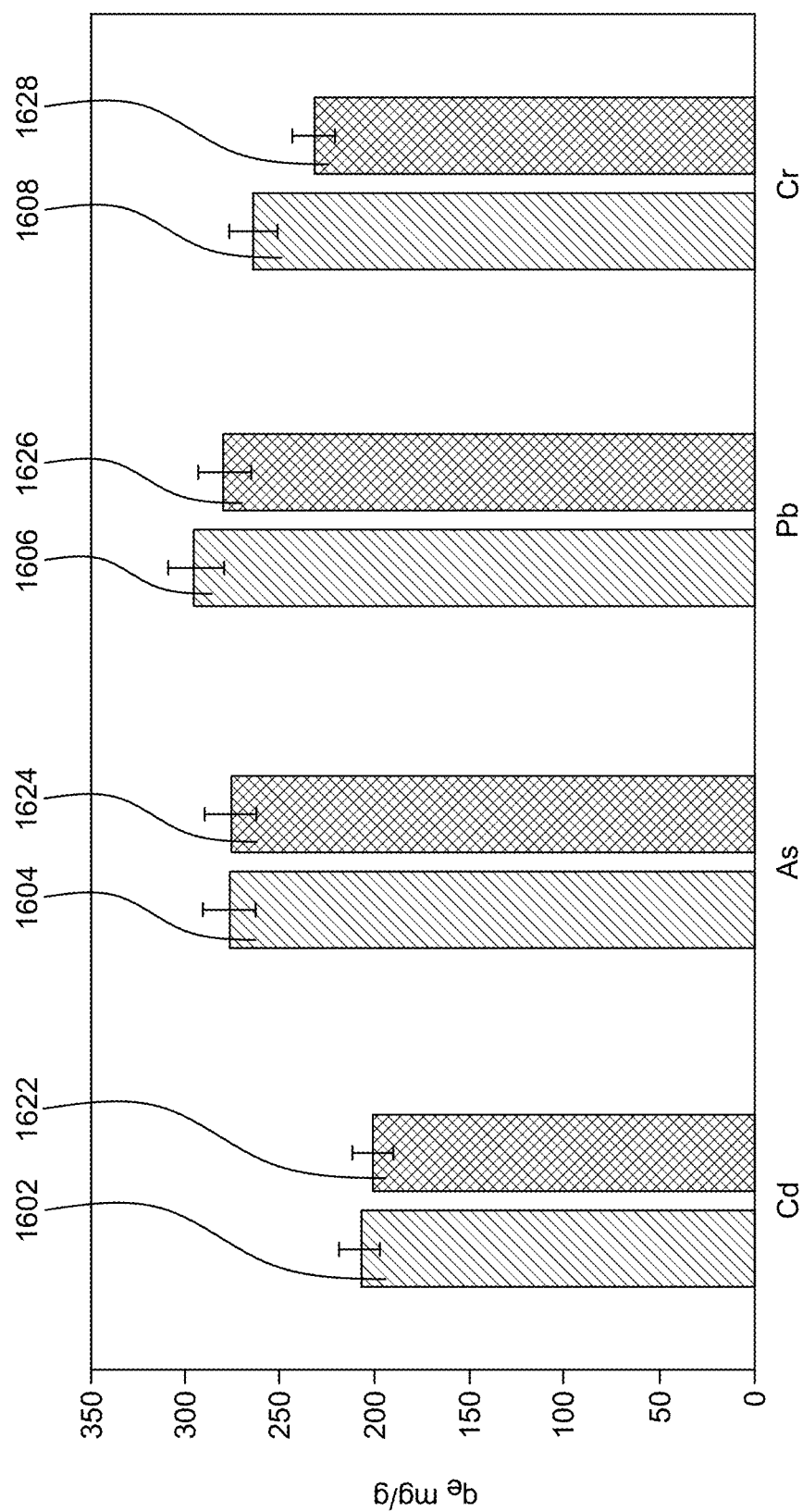
FIG. 16 shows the adsorption performance of [2-AA] $CoCl_3$ MIL adsorbent using real raw underground and wastewater samples spiked with 150 ppm each of the targeted metal ions, according to certain embodiments.

Similar results were obtained when 150 ppm each of Cd$^{2+}$, As$^{3+}$, Pb$^{2+}$, and Cr$^{3+}$ metal ions were added to real wastewater (1602, 1604, 1606, 1608) and groundwater resources (1622, 1624, 1626, and 1628), as shown in FIG. 16. This suggests the practicality of the [2-AA] CoCl$_3$ MIL adsorbent in the selective removal of Cd$^{2+}$, Pb$^{2+}$, As$^{3+}$, and Cr$^{3+}$ metal ions in complex matrices.

This present disclosure depicts the adsorption potential of two 2-anthracene ammonium-based magnetic ionic liquids (MILs) in the removal of Cd$^{2+}$, Pb$^{2+}$, As$^{3+}$, and Cr$^{3+}$ from ground and wastewater resources. The MILs, 2-anthracene ammonium tetrachloroferrate (III) or 2-anthracene ammonium trichlorocobaltate (II) ([2-AA] CoCl$_3$), were synthesized by protonation of 2-aminoanthracene, followed by complexation with FeCl$_3$/CoCl$_2$. The [2-AA] CoCl$_3$ demonstrated a slightly higher adsorption capacity to remove the targeted metal ions and was used to evaluate the adsorption parameters, kinetics, and isotherms studies. The [2-AA] CoCl$_3$ performed efficiently in both neutral and alkaline solutions, and equilibrium adsorption was recorded within 60 minutes of contact time. The adsorption process proceeded via the pseudo-second-order pathway, and the Langmuir isotherm model fitted the adsorption process, with maximum adsorption capacity in the range of 227-357 mg/g. In addition, the [2-AA] CoCl$_3$ was selective to the targeted metal ions with a large distribution coefficient and selectivity coefficient in the order of 2-3 against the interfering ions. The [2-AA] CoCl$_3$ has demonstrated practicality as an adsorbent for the selective removal of the targeted metal ions with an adsorption efficiency of above 90% even after re-using it six (6) times with similar performance in real raw underground and wastewater samples.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An adsorbent, comprising:
   a 2-anthracene ammonium magnetic ionic liquid (MIL).

2. The adsorbent of claim 1, wherein the 2-anthracene ammonium magnetic ionic liquid comprises a [FeCl$_4$]$^-$ or a [CoCl$_3$]$^-$ ion.

3. The adsorbent of claim 2, having a thermal stability up to a temperature of 400° C.

4. The adsorbent of claim 2, wherein the adsorbent is 2-anthracene ammonium trichlorocobaltate.

5. The adsorbent of claim 4, wherein the 2-anthracene ammonium trichlorocobaltate is in the form of nanoflakes having an average diameter of 2 to 10 μm.

6. The adsorbent of claim 4, wherein the 2-anthracene ammonium trichlorocobaltate is in the form of nanoflakes having an average thickness of 1 to 8 μm.

7. An adsorbent composition, comprising:
   the adsorbent of claim 4, and
   an adsorbate adsorbed on the adsorbent, wherein the 2-anthracene ammonium trichlorocobaltate in the adsorbent composition is in the form of nanoflakes having a thickness that is 2 to 8 times a thickness of nanoflakes of the 2-anthracene ammonium trichlorocobaltate in the absence of the adsorbate.

8. The adsorbent of claim 2, wherein the adsorbent is 2-anthracene ammonium tetrachloroferrate having an adsorption capacity in the range of 3 to 80 mg/g.

9. The adsorbent of claim 4, having an adsorption capacity in the range of 10 to 80 mg/g.

10. A method for the synthesis of 2-anthracene ammonium tetrachloroferrate or 2-anthracene ammonium trichlorocobaltate, comprising:
   mixing HCl with 2-aminoanthracene to form anthracene-2-aminium chloride;
   mixing FeCl$_3$ or CoCl$_2$ with the anthracene-2-aminium chloride to form 2-anthracene ammonium tetrachloroferrate or 2-anthracene ammonium trichlorocobaltate, respectively; and
   washing 2-anthracene ammonium tetrachloroferrate or 2-anthracene ammonium trichlorocobaltate.

* * * * *